US009340959B2

(12) United States Patent
Peel

(10) Patent No.: US 9,340,959 B2
(45) Date of Patent: May 17, 2016

(54) PLUMBING FIXTURE WITH MIXING VALVE AND CONTROLLER

(71) Applicant: KOHLER MIRA LIMITED, Cheltenham, Gloucestershire (GB)

(72) Inventor: Kevin T. Peel, Gloucester (GB)

(73) Assignee: KOHLER MIRA LIMITED (GB)

( * ) Notice: Subject to any disclaimer, the term of this patent is extended or adjusted under 35 U.S.C. 154(b) by 297 days.

(21) Appl. No.: 13/835,623

(22) Filed: Mar. 15, 2013

(65) Prior Publication Data

US 2013/0340852 A1 Dec. 26, 2013

(30) Foreign Application Priority Data

Jun. 22, 2012 (GB) .................................. 1211098.7
Jun. 22, 2012 (GB) .................................. 1211101.9

(51) Int. Cl.
*E03C 1/04* (2006.01)
*F17D 1/00* (2006.01)
(Continued)

(52) U.S. Cl.
CPC ................ *E03C 1/0404* (2013.01); *B05B 1/24* (2013.01); *E03B 7/006* (2013.01); *E03B 7/074* (2013.01); *E03B 7/075* (2013.01); *E03B 7/078* (2013.01); *E03C 1/02* (2013.01); *E03C 1/04* (2013.01); *E03C 1/055* (2013.01); *F16K 1/44* (2013.01); *F16K 11/22* (2013.01); *F16K 11/24* (2013.01);
(Continued)

(58) Field of Classification Search
CPC ....... F16K 11/12; F16K 11/20; F16K 11/207; F16K 11/22; F16K 11/24; F16K 49/002; F16K 31/04; G05D 7/0617; G05D 23/1393; G05D 23/1858; G05D 11/13; G05D 11/16; E03C 1/055; E03C 1/02; E03C 1/04; F17D 1/00; E03B 7/078; E03B 7/06
USPC ......... 137/602, 896, 897, 606, 607, 613, 801, 137/599.01, 599.03, 599.08, 599.12, 137/599.14, 599.16, 601.02, 601.14, 341; 236/12.1, 12.11, 12.12
See application file for complete search history.

(56) References Cited

U.S. PATENT DOCUMENTS 1,065,615 A 6/1913 Lawler
1,479,546 A 1/1924 Johnson
(Continued)

FOREIGN PATENT DOCUMENTS

CN 2255233 6/1997
CN 2531183 Y 1/2003
(Continued)

OTHER PUBLICATIONS

European Combined Search and Examination Report for corresponding EP Application No. 1211101.9; mail date Aug. 21, 2012; 9 pages.
(Continued)

*Primary Examiner* — William McCalister
*Assistant Examiner* — Ian Paquette
(74) *Attorney, Agent, or Firm* — Foley & Lardner LLP

(57) ABSTRACT

A plumbing fixture includes a body and a mixing valve within the body. The mixing valve includes a first linear actuator for controlling a first flow control valve within the mixing valve and a second linear actuator for controlling a second flow control valve within the mixing valve. A controller is located within the body and is configured to send control signals to control actuation of the linear actuators.

35 Claims, 14 Drawing Sheets

(51) Int. Cl.

| | |
|---|---|
| ***E03B 7/07*** | (2006.01) |
| ***E03B 7/00*** | (2006.01) |
| ***F16K 49/00*** | (2006.01) |
| ***G05D 7/06*** | (2006.01) |
| ***G05D 23/19*** | (2006.01) |
| ***F16K 11/00*** | (2006.01) |
| ***E03C 1/02*** | (2006.01) |
| ***F16K 31/04*** | (2006.01) |
| ***G05D 11/13*** | (2006.01) |
| ***B05B 1/24*** | (2006.01) |
| ***G05D 11/16*** | (2006.01) |
| ***G05D 23/185*** | (2006.01) |
| ***E03C 1/05*** | (2006.01) |
| ***G05D 23/13*** | (2006.01) |
| ***F16K 1/44*** | (2006.01) |
| ***F16K 11/24*** | (2006.01) |
| ***F16K 11/22*** | (2006.01) |

(52) U.S. Cl.

CPC ................. *F16K 19/00* (2013.01); *F16K 31/04* (2013.01); *F16K 49/002* (2013.01); *F17D 1/00* (2013.01); *G05D 7/0617* (2013.01); *G05D 11/13* (2013.01); *G05D 11/16* (2013.01); *G05D 23/1393* (2013.01); *G05D 23/1858* (2013.01); *G05D 23/19* (2013.01); *G05D 23/1917* (2013.01); *Y10T 137/0318* (2015.04); *Y10T 137/0329* (2015.04); *Y10T 137/0391* (2015.04); *Y10T 137/0424* (2015.04); *Y10T 137/6606* (2015.04); *Y10T 137/7759* (2015.04); *Y10T 137/8376* (2015.04); *Y10T 137/8593* (2015.04); *Y10T 137/86389* (2015.04); *Y10T 137/87668* (2015.04); *Y10T 137/87684* (2015.04); *Y10T 137/87692* (2015.04)

(56) References Cited

U.S. PATENT DOCUMENTS 1,500,820 A 7/1924 Jones
1,923,711 A 8/1933 Decker
2,044,634 A 6/1936 Reider
2,449,766 A 9/1948 Brown
2,452,367 A 10/1948 Gangloff
3,012,583 A 12/1961 Gorgens et al.
3,087,675 A 4/1963 Honegger
3,116,748 A 1/1964 Wasson
3,150,687 A 9/1964 Kalle
3,561,481 A 2/1971 Taplin
3,561,482 A 2/1971 Taplin
3,584,784 A 6/1971 Burhop
3,587,156 A 6/1971 Sorenson
3,633,617 A 1/1972 Stacey et al.
3,696,836 A 10/1972 Bauer
3,706,872 A 12/1972 Trabilcy
3,762,443 A 10/1973 Sorenson
3,896,836 A 7/1975 Labarre
3,915,193 A 10/1975 Rutt
3,990,477 A 11/1976 Johnson
4,177,970 A 12/1979 Ring
4,253,482 A 3/1981 Stephens
4,324,267 A 4/1982 Bach
4,422,470 A 12/1983 Jackson
4,448,211 A 5/1984 Yoshida
4,696,428 A 9/1987 Shakalis
4,711,392 A 12/1987 Kidouchi
4,738,393 A 4/1988 Bergmann et al.
4,739,798 A 4/1988 Botnick
4,785,845 A 11/1988 Kochal
4,873,830 A 10/1989 Blattler
4,895,126 A 1/1990 Nishimiya et al.
4,928,494 A 5/1990 Glamm
4,955,535 A 9/1990 Tsutsui et al.
4,967,794 A 11/1990 Tsutsui et al.
4,971,106 A 11/1990 Tsutsui et al.
4,986,085 A 1/1991 Tischer
5,011,112 A 4/1991 Glamm
5,033,671 A 7/1991 Shiba
5,050,062 A 9/1991 Hass
5,083,745 A 1/1992 Tischer
5,085,399 A 2/1992 Tsutsui et al.
5,199,790 A 4/1993 Pawelzik et al.
5,206,963 A 5/1993 Wiens
5,417,083 A 5/1995 Eber
5,647,531 A 7/1997 Kline et al.
5,855,356 A 1/1999 Fait
5,870,302 A 2/1999 Oliver
5,979,775 A 11/1999 Raya
5,993,117 A 11/1999 Lancaster
6,070,615 A 6/2000 Chen
6,145,538 A 11/2000 Park
6,157,103 A 12/2000 Ohta
6,286,550 B1 9/2001 Yamaki et al.
6,668,854 B2 12/2003 Fukuda
6,688,332 B2 2/2004 Liesenhoff
6,708,721 B2 3/2004 Fukuda
6,748,969 B2 6/2004 Kanzaka
6,805,152 B2 10/2004 Kanzaka
6,854,658 B1 2/2005 Houghton et al.
6,860,288 B2 3/2005 Uhler
6,895,995 B2 5/2005 Kirkman
6,898,467 B1 5/2005 Smith et al.
6,932,112 B2 8/2005 Bradford
7,000,854 B2 2/2006 Malek
7,010,396 B2 3/2006 Ware
7,017,884 B2 3/2006 Brinks
7,147,203 B2 12/2006 Terrell
7,177,725 B2 2/2007 Nortier et al.
7,228,874 B2 * 6/2007 Bolderheij ................ E03C 1/04 137/801
7,286,904 B2 10/2007 Graham
7,303,151 B2 12/2007 Wu
7,367,352 B2 5/2008 Hagen
7,372,002 B2 5/2008 Nakamura
7,403,839 B1 7/2008 Kaplan
7,445,024 B2 11/2008 Paterson et al.
7,665,483 B1 2/2010 Sid
7,726,333 B2 6/2010 Hoshi
7,814,929 B2 10/2010 Yewdall et al.
7,857,234 B2 12/2010 Daley et al.
7,889,187 B2 2/2011 Freier et al.
8,162,236 B2 4/2012 Rodenbeck et al.
8,950,426 B2 2/2015 Yewdall et al.
2002/0019709 A1 2/2002 Segal
2003/0080194 A1 5/2003 O'Hara et al.
2003/0168111 A1 9/2003 Koga
2006/0144443 A1 7/2006 Yewdall et al.
2006/0161270 A1 7/2006 Luskin et al.
2006/0231638 A1 10/2006 Belz
2007/0119501 A1 5/2007 Pinette
2007/0246550 A1 10/2007 Rodenbeck et al.
2008/0099088 A1 5/2008 Boey
2008/0112843 A1 5/2008 Peel et al.
2008/0167931 A1 7/2008 Gerstemeier
2008/0196156 A1 8/2008 Brewin
2008/0302991 A1 12/2008 Tseng
2009/0056011 A1 * 3/2009 Wolf ....................... E03C 1/057 4/623
2009/0119142 A1 5/2009 Yenni et al.
2009/0261282 A1 10/2009 Connors
2010/0095443 A1 4/2010 Nishimura et al.
2010/0116224 A1 5/2010 Leeland
2010/0132803 A1 6/2010 Fima
2010/0155505 A1 * 6/2010 Lopp et al. ................. 239/428.5
2010/0161144 A1 6/2010 Crist
2011/0088799 A1 * 4/2011 Jung ............................ 137/607
2011/0094481 A1 4/2011 Zui et al.
2011/0108135 A1 5/2011 Zhong
2011/0192476 A1 8/2011 Underwood
2011/0233295 A1 * 9/2011 Yewdall et al. ................... 239/1
2012/0012768 A1 1/2012 Yahr

(56) References Cited

U.S. PATENT DOCUMENTS

| | | | |
|---|---|---|---|
| 2012/0175428 A1 | 7/2012 | Jouneau et al. |
| 2013/0062422 A1 | 3/2013 | Marty |
| 2013/0075483 A1 | 3/2013 | Marty |

FOREIGN PATENT DOCUMENTS

| | | | |
|---|---|---|---|
| CN | 101000111 | A | 7/2007 |
| CN | 201227179 | Y | 4/2009 |
| CN | 201235319 | Y | 5/2009 |
| CN | 201526709 | | 7/2010 |
| CN | 201680051 | | 12/2010 |
| CN | 201896985 | U | 7/2011 |
| CN | 202118366 | U | 1/2012 |
| CN | 202252130 | U | 5/2012 |
| CN | 202901383 | | 4/2013 |
| CN | 202937823 | | 5/2013 |
| DE | 195 16 887 | | 11/1996 |
| DE | 100 33 351 | | 2/2002 |
| DE | 1020060 08 524 | | 8/2006 |
| DE | 102006024069 | | 11/2007 |
| DE | 2020090 07 243 | | 10/2009 |
| DE | 202011000038 | | 6/2012 |
| DE | 102012100097 | | 7/2012 |
| EP | 1 583 920 | | 10/2005 |
| EP | 2169124 | A2 | 3/2010 |
| FR | 2916033 | | 11/2008 |
| GB | 0 937 091 | | 9/1963 |
| GB | 937091 | A | 9/1963 |
| GB | 1123256 | | 8/1968 |
| GB | 2081841 | | 2/1982 |
| GB | 2 143 304 | | 2/1985 |
| GB | 2143304 | A | 2/1985 |
| JP | H05108170 | | 4/1993 |
| JP | H08270834 | A | 10/1996 |
| NL | 1035474 | | 2/2010 |
| NL | 1035475 | | 2/2012 |
| WO | WO 2007/096771 | | 8/2007 |
| WO | WO-2010/021891 | | 2/2010 |
| WO | WO2010/021891 | A1 | 2/2010 |

OTHER PUBLICATIONS

International Search Report and Written Opinion for Application No. PCT/IB2013/001646, mail date Sep. 19, 2013, 12 pages.

International Search Report and Written Opinion for Application No. PCT/IB2013/001647, mail date Oct. 25, 2013, 11 pages.

* cited by examiner

PLUMBING FIXTURE WITH MIXING VALVE AND CONTROLLER

CROSS-REFERENCE TO RELATED PATENT APPLICATIONS

The present application claims the benefit of and priority to United Kingdom Patent Application No. 1211101.9, filed Jun. 22, 2012, and United Kingdom Patent Application No. 1211098.7, also filed Jun. 22, 2012. The entire disclosures of United Kingdom Patent Application No. 1211101.9 and United Kingdom Patent Application No. 1211098.7 (including the specification, drawings, claims and abstract), are incorporated herein by reference. The present application also incorporates herein by reference (including the specification, drawings, claims and abstract), but does not claim priority to, U.S. patent application Ser. No. 13/797,263, filed Mar. 12, 2013.

BACKGROUND

This application relates to valves, especially valves for plumbing fixtures, fittings and water supply systems and installations for washing, showering, bathing and the like employing such plumbing fixtures and fittings. The invention has particular, but not exclusive, application to a mixer valve, especially a thermostatic mixer valve and, more particularly, to an electronically controlled thermostatic mixer valve. The invention also relates to a flow control valve and to applications of such flow control valve in plumbing fixtures and fittings and parts thereof including, for example, a mixer valve.

A mixer valve receives a fluid flow from at least two sources and provides an output comprising a mix or blend of the sources. Typically, mixer valves are used to control water flow in plumbing fixtures and fittings. In such fixtures and fittings, the mixer valve commonly receives a first input from a cold water supply and a second input from a hot water supply. The mixer valve includes controls that act to control in what proportions the hot and cold supplies are mixed. Thus, the mixer valve mixes the hot and cold supplies in accordance with the setting of its controls to achieve a desired water outlet temperature.

Manually operable thermostatic mixer valves typically include a valve member that is manually adjustable to blend the hot and cold supplies in the correct proportion to set a desired water outlet temperature and a thermostat responsive to the water outlet temperature to adjust the position of the valve member to maintain constant the selected water outlet temperature. The known manually operable thermostatic mixer valves may also provide control of the water outlet flow rate.

An example of such manually operable thermostatic mixer valves is shown in FIGS. 12 and 13. The mixer valve 101 is designed for mounting on a wall or partition 102 within a shower enclosure and has elbow members 103, 104 either side of a waisted body 105. The elbows 103, 104 are connected to incoming supplies 106, 107 of hot and cold water entering the enclosure through the wall 102.

The body 105 houses a valve mechanism including a valve member that is axially movable between hot and cold seats to control the relative proportions of hot and cold water admitted to a mixing chamber. The valve member is manually adjusted to set the desired outlet water temperature by a rotatable temperature control knob 110 at the front of the body 105.

The mixing chamber communicates with an outlet 108 in the body. The outlet 108 is shown arranged on the underside of the body 105 when the valve 101 is installed on the wall 102 for connection to a flexible hose that 109 delivers water to a handset. In other arrangements, the outlet may be arranged on the top of the body 105 when the valve 101 is installed on the wall 102 for connection to a rigid riser pipe that delivers water to a fixed overhead shower.

The valve mechanism includes a thermostat responsive to the water temperature in the mixing chamber to adjust the position of the valve member to maintain constant the selected water temperature. The valve further includes a rotatable flow control knob 111 mounted concentric with the temperature control knob 110 to control and regulate the flow of water from off to fully open.

Such known valves 101 are relatively large (the inlets centers are typically spaced 150 mm (6 inches) apart) and are often made of metal and therefore relatively heavy and expensive to manufacture.

Electronically controlled thermostatic mixer valves typically utilize motors to control the movement of a valve member to blend the hot and cold supplies in the correct proportion to set a desired water outlet temperature and a temperature sensor responsive to the water outlet temperature to provide a signal to control circuitry to operate the motor to adjust the position of the valve member to maintain constant the selected water outlet temperature.

An example of such electronically operable thermostatic mixer valves is shown in FIG. 14 and a mixer unit incorporating the mixer valve is shown in FIG. 15. The mixer valve 201 has a body 202 with inlets 203, 204 for connection to supplies of hot and cold water and an outlet 205. The body 202 houses a valve mechanism including a valve spool 206 having two parts 206*a*, 206*b* provided with interlocking castellations that form a series of slotted ports 207.

The inlets 203, 204 open to inlet chambers that surround the spool 206 and the valve spool 206 is axially movable between a first end position in which the ports 207 communicate with the inlet chamber connected to the cold water supply corresponding to full cold and a second end position in which the ports 207 communicate with the inlet chamber connected to the hot water supply corresponding to full hot. Between the end positions, the ports 207 communicate with both inlet chambers and, adjusting the axial position of the spool 206 between the end positions adjusts the relative proportions of hot and cold water flowing to the outlet 205 and thus the water outlet temperature.

The spool 206 is axially adjustable under the control of a stepper motor 208 that is coupled to the spool 206 by a drive mechanism including a drive rod 209. The stepper motor 208 is controlled by an electronic controller 210 (FIG. 15) arranged to receive signals from a user interface (not shown) for selecting the desired water outlet temperature and from a temperature sensor (not shown) mounted in the outlet 205 to adjust the position of the spool 206 to achieve and maintain the desired outlet water temperature.

Such known electronic mixer valves 201 are relatively large and only control the outlet water temperature not the flow rate. Consequently a separate electronically operable flow control valve 211 is provided with associated controls to start/stop water flow and control the flow rate. The flow control valve 211 has an inlet 212 connected to the outlet 205 of the mixer valve 201. A valve member 213 engages a valve seat 214 to prevent flow of water from the inlet 212 to an outlet 215 in the closed position of the valve.

The valve member 213 is urged away from the valve seat 214 to open the flow control valve 211 when a solenoid 217 is energized and opening movement of the valve member 213 is controlled by a stepper motor 216 via a drive rod 218 to control the flow rate of water delivered to the outlet 215. The stepper motor 216 is controlled by the electronic controller 210 that receives signals from the user interface for selecting the desired flow rate of the outlet water and from a flow rate sensor mounted in the outlet to adjust the position of the valve member 213 to achieve and maintain the desired outlet water flow rate.

The mixer valve 201 and separate flow control valve 211 are typically combined in a single unit 219 within a housing 220 for connection to the electrical supply for the stepper motors. The large size of the units 219 renders them unsuitable for mounting in a shower enclosure. As a result, they are usually mounted remote from the shower enclosure, for example in the ceiling above the shower enclosure with the outlet 215 supplying connecting pipework to deliver outlet water to an overhead shower, a handset or other spray device within the shower enclosure and with a wired or wireless connection from the user interface located in the shower enclosure to the electronic controls for the mixer valve and flow control valve.

Due to the size and complexity of many parts of the mixer valve and flow control valve that form the water way and come into contact with the water, such parts are made of plastics materials to facilitate manufacture and reduce the weight of the units. The use of plastics materials however gives rise to a health risk from the presence of harmful micro-organisms in the water supply, especially bacteria and in particular legionella bacteria. The bacteria readily form a bio-film on surfaces of the waterway in contact with the water that are made of plastics material and the growth of bacteria forming the bio-film is promoted in the warm water present in the waterways, especially immediately after use while the water remaining in the valve is still warm and before it has cooled down. The large surface area of the waterways in the known electronically controlled mixer valves therefore presents a particular problem for effective control of bacteria to reduce the risk of users being infected by bacteria in the fine droplets of water present in the shower area when showering and which can be readily inhaled.

It is known to periodically flush the waterways with hot water for a pre-determined period of time, typically at least 65° C. for at least 10 minutes, to kill bacteria present on the surface of the waterways. However, if the water used is not hot enough or is not present for a sufficient period of time the bacteria can survive and continue to grow. Also flushing with hot water may not remove bacteria present on the surface of the waterway in trapped areas of the waterway that are not flushed by the hot water. This can be a further problem affecting the efficient removal of bacteria in complex waterways made of plastics materials.

Hence a need exists for improved valves for plumbing fixtures, fittings and water supply systems and installations for washing, showering, bathing and the like employing such plumbing fixtures and fittings.

SUMMARY

An exemplary embodiment relates to a plumbing fixture that includes a body and a mixing valve within the body. The mixing valve includes a first linear actuator for controlling a first flow control valve within the mixing valve and a second linear actuator for controlling a second flow control valve within the mixing valve. A controller is located within the body and is configured to send control signals to control actuation of the linear actuators.

Another exemplary embodiment relates to a plumbing fixture incorporating a mixing valve of reduced size within a portion thereof. The plumbing fixture includes a mixing valve within a portion of the body that is coupled to a first fluid delivery line providing a first fluid and to a second fluid delivery line providing the second fluid, the mixing valve further comprising a first stepper motor for controlling a first flow control valve within the mixing valve and a second stepper motor for controlling a second flow control valve within the mixing valve. The plumbing fixture also includes a controller within the plumbing fixture that is configured to control operation of the first and second stepper motors.

BRIEF DESCRIPTION OF THE DRAWINGS

There now follows by way of example only a detailed description of various exemplary embodiments disclosed in the present application, with reference to the accompanying drawings, in which.

DETAILED DESCRIPTION

Figure 1:
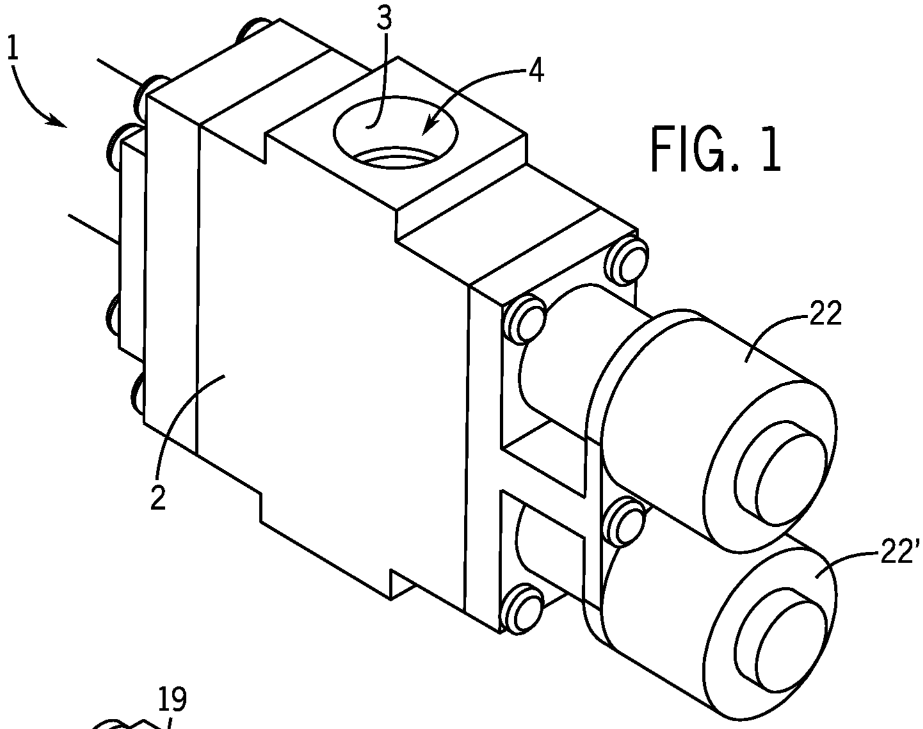
FIG. 1 shows a view of an embodiment of a mixer valve.

According to an exemplary embodiment, a mixer valve includes a first fluid inlet adapted to receive a first fluid, a second fluid inlet adapted to receive a second fluid, a fluid outlet adapted to output the first fluid or the second fluid or a mixture thereof, and a first flow control valve for controlling the flow of fluid from the first fluid inlet and a second flow control valve for controlling the flow of fluid from the second fluid inlet, each of the first and second flow control valves including a valve member assembly to control the fluid flow through the respective flow control valve, the valve member assembly and the fluid inlet of each of the first and second flow control valves being adapted and arranged such that, when in use, fluid flowing through the first flow control valve exerts substantially no net force on the valve member assembly of the first flow control valve and fluid flowing through the second flow control valve exerts substantially no net force on the valve member assembly of the second flow control valve.

According to another exemplary embodiment, there is provided a mixer valve for use in controlling mixing of two supplies of water having different temperatures comprising a cold water inlet adapted to receive a supply of cold water, a hot water inlet adapted to receive a supply of hot water, a water outlet adapted to output cold water or hot water or a mixture thereof, and a first flow control valve for controlling the flow of cold water from the cold water inlet to the water outlet and a second flow control valve for controlling the flow of hot water from the hot water inlet to the water outlet, each of the first and second flow control valves including a valve inlet communicating with the associated water inlet, first and second, separate valve outlets communicating with the water outlet and a valve member assembly to control the flow of water through the valve outlets, wherein each valve member assembly includes a first valve member adapted to engage with a first valve seat associated with the first valve outlet in a closed position of the flow control valve and a second valve member adapted to engage with a second, separate, valve seat associated with the second valve outlet in the closed position of the flow control valve, wherein the first valve member is arranged to be urged closed by water entering through the valve inlet and the second valve member is arranged to be urged open by water entering through the valve inlet such that, when in use, water flowing through the first flow control valve exerts substantially no net force on the valve member assembly of the first flow control valve and water flowing through the second flow control valve exerts substantially no net force on the valve member assembly of the second flow control valve.

By the term "substantially no net force" we mean that the valve member assembly is essentially "force balanced" with respect to the fluid flow. In other words, the force required to actuate the valve member assembly when controlling the valve is substantially independent of fluid flow. As a result, the actuating force can be reduced compared to valves where there is a significant imbalance of the forces due to fluid flow.

Reducing the actuating force to operate the valve member assembly may enable the actuator to be made smaller than would otherwise be possible with potential cost and energy savings. Consequently, the mixer valve itself may be made smaller (because less power is required to operate the valve member assembly) than would otherwise be possible in existing mixer valves.

By reducing the size of the mixer valve, the size of the waterways within the mixer valve and thus the volume of water present in the mixer valve and the available surface area in contact with the water for bio-film to form and bacteria to grow can be reduced. Also the occurrence of trapped areas in the waterways where water can collect and promote growth of bacteria may be reduced. Furthermore, by reducing the size of the mixer valve, it may be possible to manufacture the mixer valve, especially parts forming the waterways, from metal rather than plastics. The use of metals can have further benefits for controlling the growth of bacteria. Thus, bio-films form more readily on plastics than metal and bacteria are killed by contact with certain metals, especially metal alloys containing copper such as brass.

It will be understood that reducing the effect of fluid flow on the valve member assembly is an important factor in reducing the size of the mixer valve by reducing the actuating force required to operate the valve member assembly. While it may therefore be desirable to eliminate the effect of fluid flow on the valve member assembly altogether, it may for practical reasons not always be possible to achieve.

Accordingly, while the aim may be to reduce any imbalance of the forces acting on the valve member assembly due to fluid flow when designing the mixer valve, the benefits and advantages of reduced actuating force and thus reduced size (power) of the actuator and reduced size of the mixer valve may still be achieved to a large extent even if some imbalance of the forces acting on the valve member assembly due to fluid flow is present.

In some cases, it may even be desirable to have a small imbalance of the forces acting on the valve member assembly due to fluid flow. For example, a small imbalance of the forces may be utilized to hold the valve member assembly closed without relying on the actuator. In this way, it may not be necessary to provide power to the actuator when the mixer valve is closed with consequential saving in energy costs.

Accordingly we intend the term "substantially no net force" to include not only situations where there is no imbalance of the forces acting on the valve member assembly due to fluid flow i.e. "fully force balanced", but also situations where some imbalance of the forces is present whether by design or not provided that such imbalance does not result in a significant increase in the size (power) of the actuator.

The actual force required to operate the flow control valves when fully force balanced may depend on various factors including, but not limited to (a) the size of the valve and/or of the valve member assembly, (b) the number, materials and arrangement of seals provided between the valve members and the valve seats; and (c) the number, materials and arrangement of seals provided between the spool and the housing.

Thus, for a given valve, it may be that in some embodiments a level of imbalance of up to ±10% of the actuating force when fully force balanced may be present while in other embodiments a level of imbalance of up to ±5% of the actuating force when fully force balanced may be present and in yet further embodiments a level of imbalance of the actuating force when fully force balanced of up to ±2% may be present.

According to an exemplary embodiment, each flow control valve comprises a valve inlet for receiving fluid from one of the first or second fluid inlets, the valve member assembly including a first valve member adapted to engage with a first valve seat in a closed position of the flow control valve and a second valve member adapted to engage with a second, separate, valve seat in the closed position of the flow control valve, the first valve member being arranged to be urged closed by fluid entering through the valve inlet and the second valve member being arranged to be urged open by fluid entering through the valve inlet.

This is advantageous because, when in use, the force exerted by the fluid on each of the valve members can be balanced (as discussed herein) such that the actuating force to move the valve members from their respective valve seats can be reduced.

According to an exemplary embodiment, each valve inlet is located between the first valve member and the second valve member of each of the first and second flow control valves. For example, according to one particular exemplary embodiment, the valve inlet is configured to open into an inlet chamber defined by a chamber wall having a first valve outlet and a second valve outlet formed therein. The first valve seat may be associated with the first valve outlet and the second valve seat may be associated with the second valve outlet.

According to an exemplary embodiment, the mixer valve includes a mixing chamber that includes the fluid outlet, the mixing chamber being arranged to receive fluid from the first and second fluid outlets of the flow control valves. This is advantageous as it has been found that a high flow rate can be achieved even when the valve is miniaturized (i.e., reduced in size).

According to an exemplary embodiment, the first and second valve outlets may be of similar size. In some embodiments, the first and second valve outlets may be the same size. This is advantageous as it been found to assist balancing the valve assemblies (as discussed herein). Furthermore, using two outlets we can achieve flow rates comparable with using a single, larger outlet, thereby allowing the valve to be miniaturized (i.e. reduced in size).

According to an exemplary embodiment, the first valve member and second valve member are connected by a spool. In particular, the valve members may be fixedly mounted to the spool. According to an exemplary embodiment, the spool may be coupled to an actuator which controls the position of the valve members relative to their respective valve seats. According to an exemplary embodiment, the actuator comprises an electrically-powered motor. The actuator may comprise a stepper motor.

It may be that the motor can be very low power as the double valve member design ensures that the valve member assembly is substantially balanced against the force exerted by the fluid (as discussed herein). Thus, only a small actuation force is required. The stepper motor may be connected to the spool such that rotational motion of the stepper motor causes linear motion of the spool. Any suitable actuator for controlling linear motion of the spool may be employed including, but not limited to, linear actuators.

According to an exemplary embodiment, the first and second valve seats may be located within the valve outlets. For example, the valve seats may include a cylindrical bore portion of the valve outlets in which the valve members are slidably received in the closed position. This is advantageous as the spool carrying the valve members can be fitted from one end of the valve by inserting the spool and valve members from one end of the inlet chamber through one of the valve outlets to engage the other valve outlet at the opposite end of the inlet chamber.

According to a different exemplary embodiment, the first and second valve seats may be located at one end of the valve outlets. For example, the valve seats may include an end face of the valve outlets against which the valve members seat in the closed position.

According to an exemplary embodiment, the first valve member may be received in the valve inlet chamber in an open position of the flow control valve and the second valve member may be received in the mixing chamber in the open position of the flow control valve. In this way, the first valve member moves away from its valve seat to open the valve outlet against the direction of fluid flow and the second valve member moves away from its valve seat to open the valve outlet in the direction of fluid flow.

Thus fluid flow assists opening movement of the second valve member and opposes opening movement of the first valve member. The effect of the fluid flow on each valve member is reversed when moving the valve members towards their valve seats to close the valve outlets. The fluid forces acting on the valve members can be balanced (as discussed herein) when the valve outlets and valve members are matched, i.e. of similar size, so that the actuator to operate the valve member assembly does not have to overcome a significant force imbalance due to fluid flow both when opening and closing the valve. This is advantageous as the actuation force is substantially independent of fluid flow and the actuator can be smaller than would otherwise be necessary.

According to an exemplary embodiment, the mixer valve comprises a valve housing that houses the flow control valves. The housing may include apertures that form the first fluid inlet, second fluid inlet, and fluid outlet.

According to an exemplary embodiment, the housing may be made of metal or alloy, especially alloys containing copper such as brass to kill harmful micro-organisms present in the fluid. An electrically powered heating device may be provided for thermally disinfecting the mixer valve. The mixer valve may be disabled during a thermal disinfection cycle to prevent discharge of fluid. The thermal disinfection cycle may include a heating cycle to heat the housing to a temperature sufficient to disinfect waterways within the housing and optionally a cool down cycle to allow the housing and fluid contained in the valve to cool down after the heating cycle.

According to an exemplary embodiment, the first and second flow control valves are connected to supplies of hot and cold water and are controlled in response to outlet water temperature and/or flow rate. In one exemplary arrangement, a sensor device may be arranged to measure the temperature and/or flow rate of the outlet water and the flow control valves are controlled to achieve and maintain a user selected outlet water temperature and/or flow rate. In another exemplary arrangement, a sensor device may be arranged to measure the temperature of the supplies of hot and cold water and/or flow rate of the outlet water and the flow control valves are controlled to achieve and maintain a user selected outlet water temperature and/or flow rate.

According to another exemplary embodiment, a mixer valve includes a first inlet for receiving a first fluid, a second inlet for receiving a second fluid, and a mixing chamber having a fluid outlet for outputting the first fluid or the second fluid or a mixture thereof, the mixer valve including a first flow control valve for controlling the flow of the first fluid into the mixing chamber and a second flow control valve, separate from the first flow control valve, for controlling the flow of the second fluid into the mixing chamber, wherein at least the first or second flow control valve includes at least two, separate outlets into the mixing chamber.

This is advantageous as the separate outlets ensure that a substantial flow rate can be maintained through the mixer valve even when it is miniaturized. The first inlet typically receives cold water from a cold water supply and the second inlet typically receives hot water from a hot water supply.

According to an exemplary embodiment, at least the first or second flow control valve includes a valve member assembly to control the flow through the control valve that is balanced (as discussed herein) such that fluid flowing through the control valve exerts substantially no net force on the valve member assembly. This is advantageous as the force required to actuate the valve member assembly when controlling the mixer valve is small. Accordingly, the actuator for moving the valve member assembly and the mixer valve itself can be miniaturized (i.e. reduced in size).

According to an exemplary embodiment, both the first flow control valve and the second flow control valve each include at least two separate outlets into the mixing chamber. According to an exemplary embodiment, each flow control valve is defined by an elongate valve inlet chamber having a valve inlet and two separate outlets formed at substantially opposite ends of the valve inlet chamber. Thus, each flow control valve controls the flow between the associated valve inlet chamber and the mixing chamber.

According to an exemplary embodiment, each flow control valve includes a valve member assembly including a first valve member adapted to engage with a first valve seat associated with a first of the two outlets and a second valve member adapted to engage with a second, separate, valve seat associated with a second of the two outlets in the closed position of the flow control valve.

The first valve member may be arranged to be urged closed by fluid entering the valve inlet chamber through the valve inlet and the second valve member may be arranged to be urged open by fluid entering the valve inlet chamber through the valve inlet. Thus the first and second flow control valves can be balanced (as discussed herein) due to the dual valve member design. The two outlets and two valve members ensure a substantial flow rate can be achieved while ensuring the valve members are fluid flow force balanced (as discussed herein) to aid miniaturization.

According to an exemplary embodiment, the first valve member and second valve member are connected by a spool. The valve members may be fixedly mounted to the spool. According to an exemplary embodiment, the spool is connected to an actuator, which controls the position of the valve members relative to their respective valve seats. The actuator may be an electrically powered motor, for example a stepper motor. The actuator motor can be very low power as the double valve member design ensures that the valve is balanced (as discussed herein) against the force exerted by the fluid. Thus, only a small actuation force is required. Accordingly, the stepper motor and thus the mixer valve itself can be very small compared to prior art designs.

According to an exemplary embodiment, the first and second valve outlets may be of similar size. According to an exemplary embodiment, the first and second valve outlets can be the same size. According to an exemplary embodiment, the first and second valve outlets may be axially aligned.

In some embodiments, the valve seats may be located within the valve outlets. For example, the valve seats may include a cylindrical bore portion of the valve outlets in which the valve members are slidably received in the closed position. This is advantageous as the spool carrying the valve members can be fitted from one end of the valve by inserting the spool and valve members from one end of the inlet chamber through one of the valve outlets to engage the other valve outlet at the opposite end of the inlet chamber.

In other embodiments, the valve seats may be located at one end of the valve outlets. For example, the valve seats may include an end face of the valve outlets against which the valve members seat in the closed position.

According to an exemplary embodiment, the first valve member may be received in the valve inlet chamber in an open position of the flow control valve and the second valve member may be received in the mixing chamber in the open position of the flow control valve. In this way, the first valve member moves away from its valve seat to open the valve outlet against the direction of fluid flow and the second valve member moves away from its valve seat to open the valve outlet in the direction of fluid flow.

Thus fluid flow assists opening movement of the second valve member and opposes opening movement of the first valve member. The effect of the fluid flow on each valve member is reversed when moving the valve members towards their valve seats to close the valve outlets. The fluid forces acting on the valve members can be balanced (as discussed herein) when the valve outlets and valve members are matched, i.e. of similar size, so that the actuator to operate the valve member assembly does not have to overcome a significant force imbalance due to fluid flow both when opening and closing the valve.

According to an exemplary embodiment, the mixer valve includes a housing that houses the first and second flow control valves and includes apertures that form the first fluid inlet, second fluid inlet and fluid outlet.

According to an exemplary embodiment, the housing may be made of metal or alloy, especially alloys containing copper such as brass to kill harmful micro-organisms present in the fluid. An electrically powered heating device may be provided for thermally disinfecting the mixer valve. The mixing valve may be disabled during a thermal disinfection cycle to prevent discharge of fluid. The thermal disinfection cycle may include a heating cycle to heat the housing to a temperature sufficient to disinfect waterways within the housing and optionally a cool down cycle to allow the housing and fluid contained in the valve to cool down after the heating cycle.

According to an exemplary embodiment, the first and second flow control valves are connected to supplies of hot and cold water and are controlled in response to outlet water temperature and/or flow rate. In one exemplary arrangement, a sensor device may be arranged to measure the temperature and/or flow rate of the outlet water and the flow control valves are controlled to achieve and maintain a user selected outlet water temperature and/or flow rate. In another exemplary arrangement, a sensor device may be arranged to measure the temperature of the supplies of hot and cold water and/or flow rate of the outlet water and the flow control valves are controlled to achieve and maintain a user selected outlet water temperature and/or flow rate.

According to another exemplary embodiment, a plumbing fitting may be configured to receive a mixer valve such as those described in the present application.

According to an exemplary embodiment, the plumbing fitting comprises a fluid delivery device. According to an exemplary embodiment, the fluid delivery device is a shower head. According to another exemplary embodiment, the fluid delivery device is a faucet such as a bath tap, sink tap and basin tap. As the mixer valve can be easily miniaturized (i.e. reduced in size), it can be placed within plumbing fittings where it was previously not possible to do so or doing so would have made the fitting large and/or heavy and/or cumbersome to use.

Thus, a shower system may simply comprise a shower head that receives both hot and cold water supplies through two conduits wherein the mixer valve is housed within the shower head and delivers water to an outlet of the shower head. The mixer valve may be controlled via a control device such as a user interface which may be incorporated in the shower head or provided separately and connected to the shower head via a wired or wireless link. The interface may provide control signals to an electronic controller that controls the actuators for the flow control valves according to user selected inputs of temperature and/or flow rate and/or outlet, for example where the shower system has multiple outlets. The electronic controller may receive inputs of the actual temperature of the outlet water and/or the inlet water and/or flow rate from appropriately positioned sensors and control the actuators for the flow control valves in response thereto to achieve and maintain the user selected settings. The electronic controller may include a microprocessor. The microprocessor may be programmable and may include a memory.

Likewise, a fluid delivery system may comprise a faucet that receives both hot and cold water supplies through two conduits wherein the mixer valve is housed within the faucet and delivers water to an outlet of the faucet which may, in use, project over a bath, a sink or a basin. The mixer valve may be controlled via a control device such as a user interface which may be incorporated in the faucet or provided separately and connected to the faucet via a wired or wireless link. The interface may provide control signals to an electronic controller that controls the actuators for the flow control valves according to user selected inputs of temperature and/or flow rate and/or outlet, for example where the faucet has multiple outlets. The electronic controller may receive inputs of the actual temperature of the outlet water and/or the inlet water and/or flow rate from appropriately positioned sensors and control the actuators for the flow control valves in response thereto to achieve and maintain the user selected settings. The electronic controller may include a microprocessor. The microprocessor may be programmable and may include a memory.

According to another exemplary embodiment, a shower head is configured to receive a first fluid conduit and a second fluid conduit, wherein the shower head includes a mixer valve adapted to receive a first fluid from the first fluid conduit and a second fluid from the second fluid conduit and output the first fluid or the second fluid or a blend of the first and second fluids to a shower head outlet. According to an exemplary embodiment, the mixer valve may be such as those described in the present application.

According to an exemplary embodiment, the shower head includes a stem or body portion to receive the first and second conduits and at least one outlet to discharge fluid received from the mixer valve. The stem portion may include a body having a duct therein for a fixed shower head or a handle having a duct therein for a moveable shower head. The duct may carry first and second fluid conduits. The mixer valve may be such as those described in the present application.

According to an exemplary embodiment, the shower head may be provided with a spray head having a single outlet provided with a spray plate having an array of holes for discharging water. The array of holes may be configured to discharge water in any selected one of a plurality of spray patterns.

According to another exemplary embodiment, the shower head is provided with a spray head having a plurality of outlets and the spray head is adjustable to select any one of the outlets or a combination of outlets for discharging water.

According to another exemplary embodiment, a fluid delivery device is configured to receive a first fluid conduit and a second fluid conduit, wherein the fluid delivery device includes a mixer valve adapted to receive a first fluid from the first fluid conduit and a second fluid from the second fluid conduit and output the first fluid or the second fluid or a blend of the first and second fluids to an outlet of the fluid delivery device. The mixer valve may be such as those described in the present application According to an exemplary embodiment, the fluid delivery device includes a body portion to receive the first and second conduits and an outlet to discharge fluid received from the mixer valve. The fluid delivery device may include a faucet. The faucet may comprise a tap selected from the group comprising a bath tap, a sink tap and a basin tap.

According to an exemplary embodiment, the body portion includes a base portion and a stem portion (sometimes referred to as a "spout") provided with the outlet for discharging water. The mixer valve may be located in the stem portion. This is advantageous because previous mixer taps required the mixer valve to be located in the base of the faucet rather than the spout or even separate from the faucet altogether. The mixer valves as described herein can be miniaturized (i.e. reduced in size) such that it can be located in the stem portion, adjacent to, or within the outlet of the faucet. The faucet need not have controls at its base as the faucet can simply comprise the stem portion.

The stem portion may be movable according to an exemplary embodiment. For example, it may be arranged to pivot about its base. Kitchen taps, for example, commonly have movable stem portions. The mixer valves as described in the present application can be provided or mounted in the movable stem portion and not in a fixed valve base as in prior art tap designs.

The flow control valves disclosed in the present application may be used individually as flow control valves according to an exemplary embodiment.

According to another exemplary embodiment, a flow control valve includes a valve inlet adapted to receive a fluid, a valve outlet adapted to output the fluid, the flow control valve including a valve member assembly to control the fluid flow through the flow control valve, wherein the valve member assembly and the valve inlet are adapted and arranged such that, when in use, fluid flowing through the flow control valve exerts substantially no net force on the valve member assembly.

According to an exemplary embodiment, the valve member assembly comprises a first valve member adapted to engage with a first valve seat in a closed position of the flow control valve and a second valve member adapted to engage with a second, separate, valve seat in the closed position of the flow control valve, wherein the first valve member is arranged to be urged closed by fluid entering through the valve inlet and the second valve member is arranged to be urged open by fluid entering through the valve inlet.

This is advantageous because the force exerted by the fluid on each of the valve members can be balanced (as discussed herein) such that the valve requires a small force to move the valve members from their respective valve seats.

According to an exemplary embodiment, the valve inlet is located between the first valve member and the second valve member. The valve inlet may open into an inlet chamber defined by a chamber wall having a first valve outlet and a second valve outlet formed therein. The first valve seat may be associated with the first valve outlet and the second valve seat may be associated with the second valve seat.

According to an exemplary embodiment, the valve includes an outlet chamber that includes the fluid outlet with the outlet chamber being arranged to receive fluid from the first and second valve outlets of the inlet chamber. The first and second valve outlets may be of similar size. The first and second valve outlets may be axially aligned, for example at opposite ends of the inlet chamber.

According to an exemplary embodiment, the first valve member and second valve member are connected by a spool. In particular, the valve members may be fixedly mounted to the spool. According to an exemplary embodiment, the spool is connected to an actuator which controls the position of the valve members relative to their respective valve seats.

According to an exemplary embodiment, the actuator includes an electrically-powered motor. The actuator may comprise a stepper motor. The motor can be very low power as the double valve member design ensures that the valve is balanced (as discussed herein) against the force exerted by the fluid. Thus, only a small actuation force is required. The stepper motor may be connected to the spool such that rotational motion of the stepper motor causes linear motion of the spool. Any suitable actuator for controlling linear motion of the spool may be employed including, but not limited to, linear actuators.

According to an exemplary embodiment, the valve seats are located within the valve outlets. The valve seats may include a cylindrical bore portion of the valve outlets in which the valve members are slidably received in the closed position.

According to an exemplary embodiment, the valve seats are located at one end of the valve outlets. The valve seats may include an end face of the valve outlets against which the valve members seat in the closed position.

According to an exemplary embodiment, the first valve member is received in the valve inlet chamber in an open position of the flow control valve and the second valve member is received in the outlet chamber in the open position of the flow control valve. In this way, the first valve member moves away from its valve seat to open the valve outlet against the direction of fluid flow and the second valve member moves away from its valve seat to open the valve outlet in the direction of fluid flow.

Thus fluid flow assists opening movement of the second valve member and opposes opening movement of the first valve member. The effect of the fluid flow on each valve member is reversed when moving the valve members towards their valve seats to close the valve outlets. The fluid forces acting on the valve members can be balanced (as discussed herein) when the valve outlets and valve members are matched, i.e. of similar size, so that the actuator to operate the valve member assembly does not have to overcome a significant force imbalance due to fluid flow both when opening and closing the valve.

According to an exemplary embodiment, the flow control valve includes a valve housing that houses the valve member assembly. The housing may have apertures that form the fluid inlet and fluid outlet.

According to an exemplary embodiment, the housing may be made of metal or alloy, especially alloys containing copper such as brass to kill harmful micro-organisms present in the fluid. An electrically powered heating device may be provided for thermally disinfecting the flow control valve. The flow control valve may be disabled during a thermal disinfection cycle to prevent discharge of fluid. The thermal disinfection cycle includes a heating cycle to heat the housing to a temperature sufficient to disinfect waterways within the housing and a cool down cycle to allow the housing and fluid contained in the valve to cool down after the heating cycle.

According to another exemplary embodiment, a flow control valve includes an inlet for receiving a fluid, and an outlet chamber having an outlet for outputting the fluid, the flow control valve controlling the flow of fluid into the outlet chamber, wherein the flow control valve includes at least two, separate valve outlets into the outlet chamber.

This is advantageous as the separate outlet apertures ensure that a substantial flow rate can be maintained through the valve even when it is miniaturized (i.e. reduced in size).

According to an exemplary embodiment, the flow control valve includes an elongate inlet chamber having the inlet and two separate valve outlets formed at substantially opposite ends of the inlet chamber.

According to an exemplary embodiment, the flow control valve includes a valve member assembly to control the flow through the control valve that is balanced (as discussed herein) such that fluid flowing through the control valve exerts substantially no net force on the valve member assembly. This is advantageous as the force required to actuate the valve member assembly when controlling the valve is small. Accordingly, the actuator for moving the valve member assembly and the valve itself can be miniaturized (i.e. reduced in size).

According to an exemplary embodiment, the valve member assembly includes a first valve member adapted to engage with a first valve seat associated with a first of the at least two valve outlets in a closed position of the flow control valve and a second valve member adapted to engage with a second, separate, valve seat associated with a second of the at least two valve outlets in the closed position of the flow control valve.

According to an exemplary embodiment, the first valve member is arranged to be urged closed by fluid entering through the inlet chamber through the inlet and the second valve member is arranged to be urged open by fluid entering the inlet chamber through the inlet. Thus the flow control valve can be balanced (as discussed herein) due to the dual valve member design. The two outlets and two valve members ensure a substantial flow rate can be achieved.

According to an exemplary embodiment, the valve inlet is located between the first valve member and the second valve member. The valve inlet may open into the inlet chamber defined by a chamber wall in which the first valve outlet and the second valve outlet are formed.

According to an exemplary embodiment, the first valve member and second valve member are connected by a spool. The valve members may be fixedly mounted to the spool.

According to an exemplary embodiment, the spool is coupled to an actuator which controls the position of the valve members relative to their respective valve seats. The actuator motor may comprise an electrically powered motor and can be very low power as the double valve member design ensures that the valve is balanced against the force exerted by the fluid. Thus, only a small actuation force is required. Accordingly, a stepper motor can be used and thus the flow control valve itself can be very small compared to prior art designs.

According to an exemplary embodiment, the first and second valve outlets are of similar size. The first and second valve outlets may be axially aligned.

According to an exemplary embodiment, the valve seats are located within the valve outlets. For example, the valve seats may include a cylindrical bore portion of the valve outlets in which the valve members are slidably received in the closed position.

According to an exemplary embodiment, the valve seats are located at one end of the valve outlets. For example, the valve seats may include an end face of the valve outlets against which the valve members seat in the closed position.

According to an exemplary embodiment, the first valve member is received in the inlet chamber in an open position of the flow control valve and the second valve member is received in the outlet chamber in the open position of the flow control valve.

According to an exemplary embodiment, the flow control valve includes a housing that includes apertures that form the fluid inlet and fluid outlet.

According to an exemplary embodiment, the housing may be made of metal or alloy, especially alloys containing copper such as brass to kill harmful micro-organisms present in the fluid. An electrically powered heating device may be provided for thermally disinfecting the flow control valve. The flow control valve may be disabled during a thermal disinfection cycle to prevent discharge of fluid. The thermal disinfection cycle may include a heating cycle to heat the housing to a temperature sufficient to disinfect waterways within the housing and optionally a cool down cycle to allow the housing and fluid contained in the valve to cool down after the heating cycle.

According to an exemplary embodiment, a method of controlling flow rate and/or temperature of outlet water from a mixer valve having first and second flow control valves is provided. The method includes connecting the first flow control valve to a first water supply, connecting the second flow control valve to a second water supply, wherein the first and second water supplies have different temperatures, configuring the first and second flow control valves so that an operating force to actuate the flow control valves is substantially independent of water flow, and controlling the first and second flow control valves separately or in combination and outputting a flow of the first water supply or the second water supply or a blend of the first and second water supplies having a desired flow rate and/or temperature.

According to another exemplary embodiment, there is provided a method of controlling flow rate and/or temperature of outlet water from a mixer valve, the method including providing the mixer valve with a cold water inlet, a hot water inlet, a water outlet, a first flow control valve for controlling flow of cold water from the cold water inlet, and a second flow control valve for controlling flow of hot water from the hot water inlet, providing each flow control valve with a valve inlet communicating with the associated water inlet, two valve outlets communicating with the water outlet and a valve member assembly to control the flow of water through the respective flow control valve, connecting the cold water inlet to a cold water supply, connecting the hot water inlet to a hot water supply, wherein the cold and hot water supplies have different temperatures, providing each valve member assembly with a first valve member adapted to engage with a first valve seat in a closed position of the associated flow control valve and a second valve member adapted to engage with a second, separate, valve seat in the closed position of the associated flow control valve so that, the first valve member is arranged to be urged closed by water entering through the valve inlet and the second valve member is arranged to be urged open by water entering through the valve inlet such that, when in use, water flowing through the first flow control valve exerts substantially no net force on the valve member assembly of the first flow control valve and water flowing through the second flow control valve exerts substantially no net force on the valve member assembly of the second flow control valve so that an operating force to actuate the first and second flow control valves is substantially independent of water flow, and controlling the first and second flow control valves separately or in combination and outputting a flow of cold water or hot water or a blend of the cold and hot water having a desired flow rate and/or temperature.

According to an exemplary embodiment, the first and second flow control valves each include a valve member assembly configured such that, when in use, fluid flowing through the valve exerts substantially no net force on the valve member assembly.

According to an exemplary embodiment, the first and second flow control valves each include a valve inlet chamber to receive water from the associated water supply and having first and second outlets opening to a mixing chamber.

According to an exemplary embodiment, the first and second outlets are arranged at opposite ends of the inlet chamber and are axially aligned and provide first and second valve seats for co-operating with first and second valve members connected to a common spool coupled to an actuator for adjusting the first and second valve members relative to the first and second valve seats for controlling flow of water from the inlet chamber to the outlet chamber.

According to an exemplary embodiment, in use, fluid flowing through each flow control valve exerts a force on each valve member wherein the force on the first valve member is substantially equal to and in the opposite direction to the force exerted on the second valve member.

According to an exemplary embodiment, the outlet water is supplied to an outlet of a water delivery device. The water delivery device may be a shower head or a faucet. The faucet may be selected from a bath tap, a sink tap and a basin tap.

According to an exemplary embodiment, a method of controlling flow rate of outlet water from a flow control valve is provided. The method includes connecting the flow control valve to a water supply, configuring the flow control valve so that an operating force to actuate the flow control valve is substantially independent of water flow, and controlling the flow control valve to output a flow of the water having a desired flow rate.

According to an exemplary embodiment, the flow control valve includes a valve member assembly configured such that, when in use, fluid flowing through the valve exerts substantially no net force on the valve member assembly.

According to an exemplary embodiment, the flow control valve includes a valve inlet chamber to receive water from the water supply and having first and second outlets opening to an outlet chamber.

According to an exemplary embodiment, wherein the first and second outlets are arranged at opposite ends of the inlet chamber and are axially aligned and provide first and second valve seats for co-operating with first and second valve members connected to a common spool coupled to an actuator for adjusting the first and second valve members relative to the first and second valve seats for controlling flow of water from the inlet chamber to the outlet chamber.

According to an exemplary embodiment, in use, fluid flowing through the flow control valve exerts a force on each valve member wherein the force on the first valve member is substantially equal to and in the opposite direction to the force exerted on the second valve member.

According to an exemplary embodiment, the outlet water is supplied to an outlet of a water delivery device. The water delivery device may be a shower head or a faucet. The faucet may be selected from a bath tap, a sink tap and a basin tap.

Other features, benefits and advantages of the mixer valve and flow control valve described herein will be apparent from the description hereinafter of exemplary embodiments thereof and of the application of the mixer valve and flow control valve to plumbing fixture and fittings and water supply systems and installations employing such plumbing fixtures and fittings. Such description is provided for the purpose of demonstrating the diverse ways in which the mixer valve and flow control valve can be configured and used and is not intended to be limiting on the scope of the disclosure.

Turning now to the accompanying drawings, FIGS. 1 to 4 show an embodiment of a mixer valve for use in controlling the mixing of two supplies of water having different temperatures (nominally hot and cold water supplies) and outputting water having a desired temperature for use. The valve may also control flow rate of the output water. The mixer valve may be incorporated into a plumbing fixture or fitting for washing, showering, bathing or the like and water supply systems and installations employing such plumbing fixtures and fittings. For example, the mixer valve may be incorporated in a faucet for a basin, sink, shower bath or the like. The mixer valve may be incorporated in a water supply system or installation having one or more outlets for washing, showering, bathing or the like. Each outlet may include a faucet incorporating the mixer valve. Alternatively, the mixer valve may be incorporated in a fitting supplying more than one outlet. For example multiple shower heads may be supplied with water from one mixer valve. Other applications and uses of the mixer valve will be apparent to those skilled in the art from the description of the invention provided herein and the invention extends to and includes all modifications and changes within the spirit and scope of the disclosure.

FIG. 1 shows the mixer valve 1 enclosed within a valve housing 2. An aperture 3 in the housing 2 forms a first fluid inlet 4 for receiving a first fluid (cold water in this embodiment). Similarly, as shown in FIG. 2, the housing 2 includes a further aperture 5 that forms a second fluid inlet 6 for receiving a second fluid (hot water in this embodiment) and a still further aperture 7 that forms a fluid outlet 8 for outputting the first fluid or the second fluid or a mixture thereof.

Figure 2:
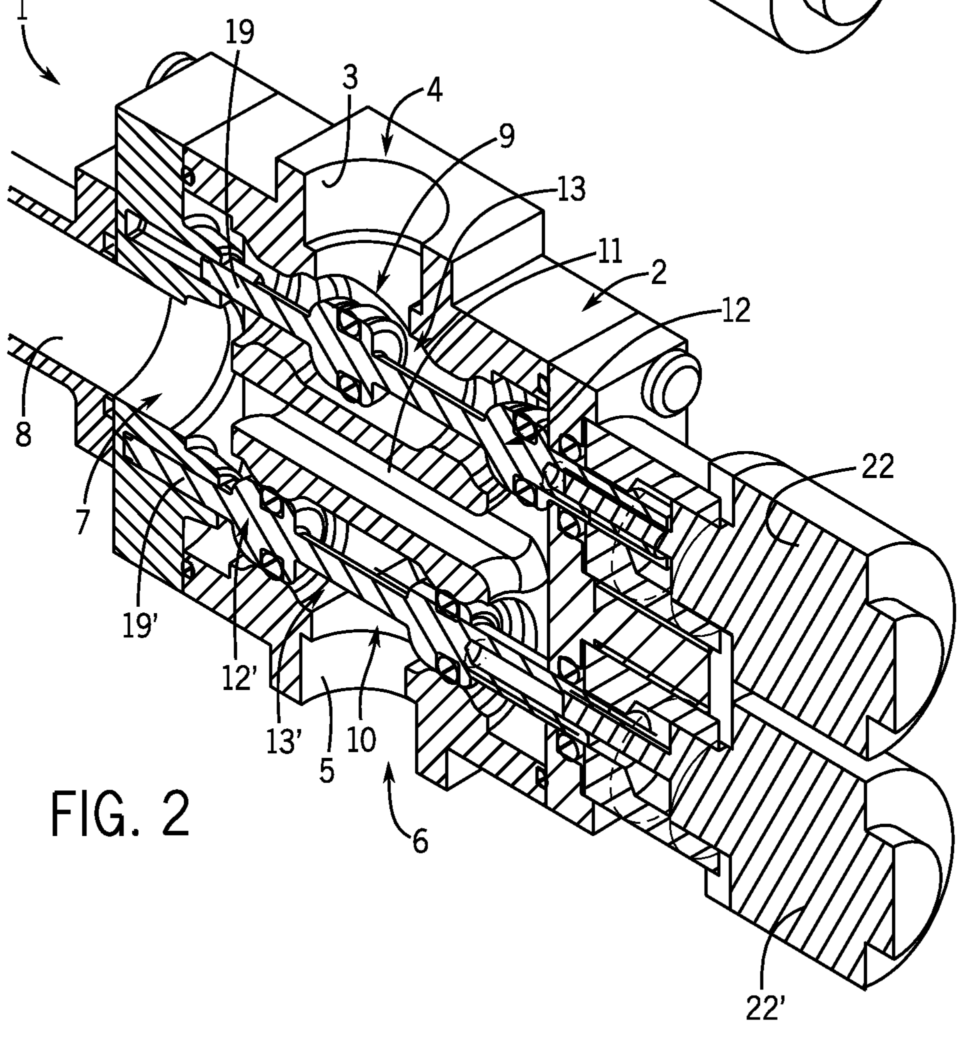
FIG. 2 shows a cross-sectional view of the mixer valve shown in FIG. 1.
Figure 3:
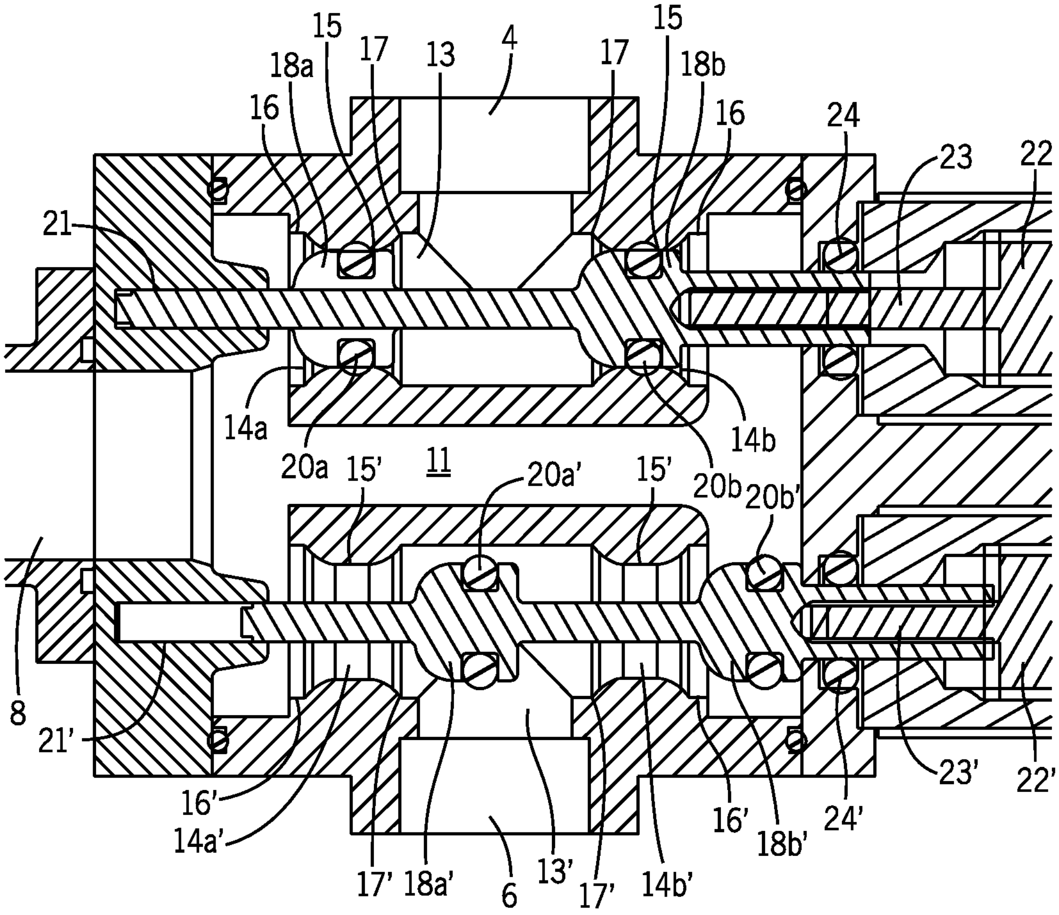
FIG. 3 shows a more detailed view of the flow control valves shown in FIG. 2.
Figure 4:
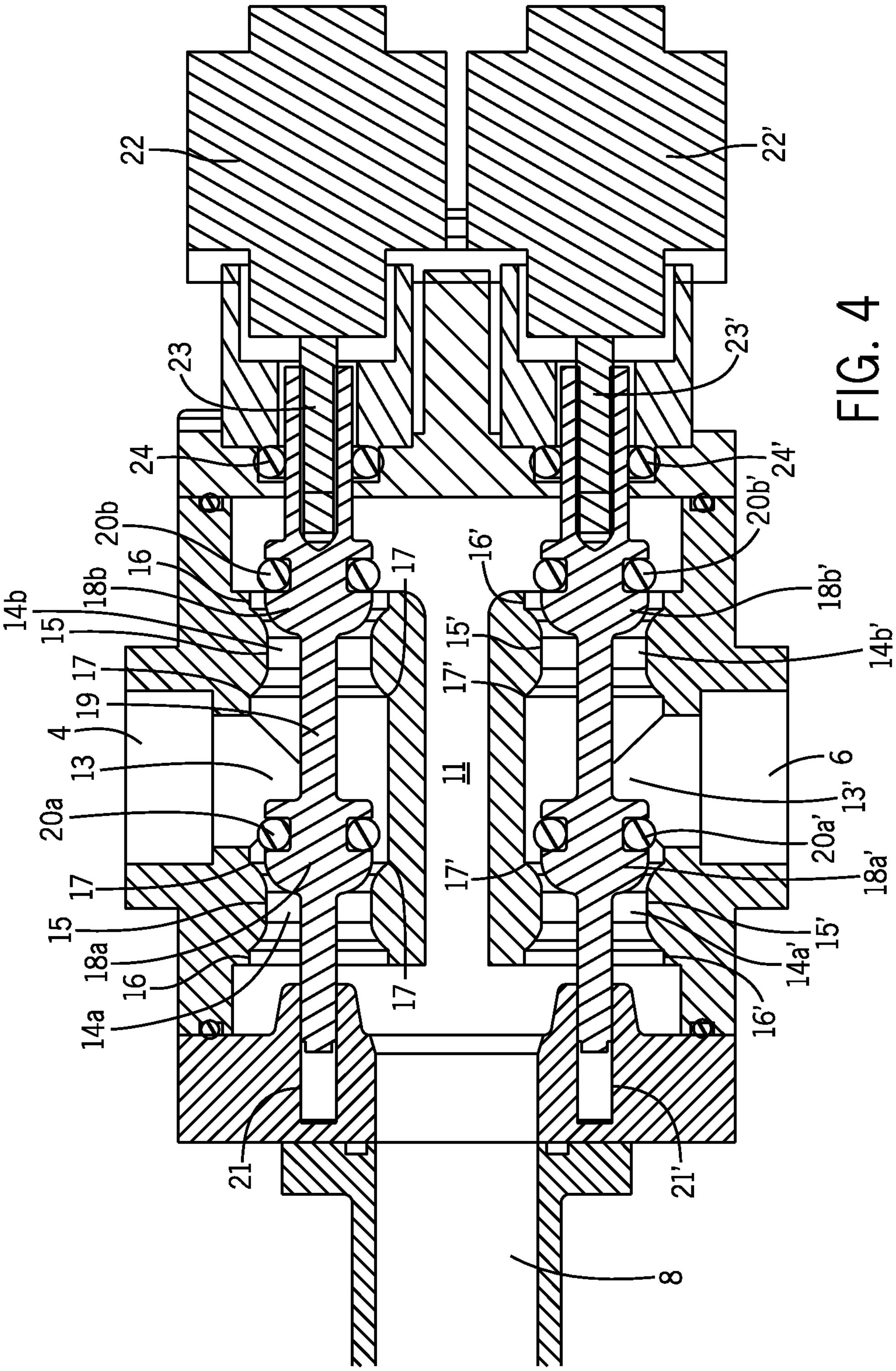
FIG. 4 shows the mid-open position of the flow control valve shown in FIGS. 1 to 3.

FIGS. 2, 3 and 4 show the mixer valve 1 in cross section. The mixer valve 1 includes a first flow control valve 9 and a second flow control valve 10 located within a mixing chamber 11. The first flow control valve 9 controls the flow of fluid from the first fluid inlet 4 to the mixing chamber 11. The second flow control valve 10 controls the flow of fluid from the second fluid inlet 6 to the mixing chamber 11. The mixing chamber 11 provides a volume in which the first and second fluids can mix and directs the mixed fluid to the fluid outlet 8.

The first and second flow control valves 9, 10 are similar and are arranged side by side in parallel and on opposite sides of the mixing chamber 11. There follows a description of the construction and operation of the first flow control valve 9 and the same reference numerals have been used but with an additional apostrophe to identify similar features of the second flow control valve 10 such that the construction and operation of the second flow control valve 10 will be apparent and understood from the description of the first flow control valve 9.

The first flow control valve 9 includes a valve member assembly 12, a valve inlet chamber 13 and first and second valve outlets 14*a* and 14*b*. The inlet chamber 13 is substantially cylindrical. The first fluid inlet 4 opens into the inlet chamber 13 through the side wall of the inlet chamber 13 (the second inlet 6 opens into the valve inlet chamber 13' of the second flow control valve 10 through the side wall of the inlet chamber 13').

The first valve outlet 14*a* is arranged at one end of the inlet chamber 13 and the second valve outlet 14*b* is arranged at an opposed end of the inlet chamber 13. Each of the valve outlets 14*a* and 14*b* includes a through bore with a cylindrical centre section 15 of reduced diameter relative to the end sections 16, 17. The bore is tapered between the centre section 15 and the end sections 16, 17. The valve outlets 14*a* and 14*b* are axially aligned and in this embodiment the centre sections 15 of the outlets 14*a* and 14*b* are coaxial and have the same diameter. The valve member assembly 12 controls the flow of water through the first flow control valve 9 from the inlet chamber 13 to the mixing chamber 11.

The valve member assembly 12 comprises a first valve member 18*a* adapted to co-operate with the first valve outlet 14*a* and a second valve member 18*b* adapted to co-operate with the second valve outlet 14*b* to control flow of water from the inlet chamber 13 to the mixing chamber 11. The first and second valve members 18*a*, 18*b* are fixedly mounted on a spool 19 such that they are held a predetermined distance apart. The predetermined distance corresponds to the distance between the first and second valve outlets 14*a*, 14*b*.

The first flow control valve 9 is shown in the full open position (maximum flow) in FIG. 2 and in the closed position (no flow) in FIG. 3 (the second flow control valve 10 is shown in the closed position in FIG. 2 and in the full open position in FIG. 3). Both flow control valves 9, 10 are shown in a mid-open position in FIG. 4.

In the closed position, the first and second valve members 18*a*, 18*b* are received in the centre sections 15 of the first and second valve outlets 14*a*, 14*b* and carry an elastomeric seal 20*a*, 20*b* that engage valve seats provided by the centre section 15 of the first and second valve outlets 14*a*, 14*b* to seal the valve outlets 14*a*, 14*b* preventing flow of water from the inlet chamber 13 to the mixing chamber 11. The elastomeric seal could be an O-ring carried by each valve member 18*a*, 18*b* or could be a resilient portion over molded onto the outwardly facing surface of the valve member.

In the full open position, the first valve member 18*a* is located within the inlet chamber 13 upstream of the associated valve outlet 14*a* and the second valve member 18*b* is located outside the inlet chamber 13 downstream of the associated valve seat 18*b* in the mixing chamber waterway. The first and second valve outlets 14*a*, 14*b* are configured such that they present substantially the same area to the water flow.

The first fluid inlet 4 opens to the inlet chamber 13 between the first and second valve outlets 14*a*, 14*b*. When opening the first flow control valve from the closed position, the force exerted by the water acts to resist opening movement of the first valve member 18*a* and to assist opening movement of the second valve member 18*b*. When closing the first flow control valve from an open position, the force exerted by the water acts to resist closing movement of the second valve member 18*b* and to assist closing movement of the first valve member 18*a*.

By configuring the valve outlets 14*a*, 14*b* to present substantially the same area to the water flow and arranging the valve members 18*a*, 18*b* so that water acts on the valve members 18*a*, 18*b* in opposite directions and with substantially the same force, the valve member assembly 12 of the first flow control valve 9 is essentially balanced (as previously discussed). As a result, there is substantially no net force on the valve member assembly 12 due to force exerted by the water pressure when opening and closing the first flow control valve 9.

A first end of the spool 19 is received within a blind guide bore 21 formed in the housing 2. A second, opposed end of the spool 19 extends through an opening in the housing 2 and is connected to an actuator 22. The actuator 22 is connected to the housing 2. The actuator 22 is adapted to control the linear position of the spool 19 and thus the position of the first and second valve members 18*a*, 18*b* with respect to the valve outlets 14*a*, 14*b*.

The actuator 22 comprises a stepper motor arranged to move the spool 19 linearly in an axial direction. Any suitable actuator for controlling linear motion of the spool may be employed in place of the stepper motor including, but not limited to, linear actuators. The actuator 22 is connected to the spool 19 by a spool connector portion 23 coupled to the second end of the spool 19 that extends through an opening in the housing 2. An elastomeric seal 24 engages the second end of the spool 19 within the opening to prevent leakage of water from the mixing chamber 11. The seal 24 could be an O-ring located in a groove in the housing 2.

The mixer valve 1 may include a controller (not shown) which provides control signals to the actuators 22, 22' of the first and second flow control valves 9, 10. The controller may also include a temperature sensor and/or flow rate sensor to measure the temperature and/or flow rate of the water leaving the fluid outlet 8 or at any other relevant point in the mixer valve or external thereto. The signals from the sensor(s) may be used to control the actuator 22, 22' of each flow control valve 9, 10 to control the temperature and/or flow rate of the water leaving the outlet 8. For example the signals may be used to maintain a desired temperature and/or flow rate or to provide feedback to the controller so that the water leaving the outlet 8 corresponds to desired settings despite changes in the water pressure and temperature at the first fluid inlet 4 and/or second fluid inlet 6. The controller may include an interface to receive settings input by a user. Wired or wireless communication may be provided between the controller, sensor(s) and interface.

Various methods of operating the actuator 22, 22' of each flow control valve 9, 10 to control the temperature and/or flow rate of the water leaving the outlet 8 are now discussed. These are examples only of possible methods of operation and are not intended to be exhaustive of all possible ways in which the mixer valve 1 may be used to provide a source of outlet water having a desired temperature and/or flow rate.

Control to Output Cold Water or Hot Water

With the mixer valve 1 in the closed position, the first actuator 22 and second actuator 22' position their respective spools 19 and 19' such that the valve members 18*a*, 18*b* and 18*a*', 18*b*' of the first and second flow control valves 9, 10 are sealed against their respective valve seats 15 and 15' to prevent flow of water to the outlet 8.

When only cold water is required by the user, the actuator 22 of the first flow control valve 9 is operated to open the first flow control valve 9 and the flow rate of cold water delivered to the outlet 8 is controlled by adjusting the position of the valve members 18*a*, 18*b* relative to the outlets 14*a*, 14*b*. The second flow control valve remains closed.

When only hot water is required by the user, the actuator 22' of the second flow control valve 10 is operated to open the second flow control valve 10 and the flow rate of hot water delivered to the outlet 8 is controlled by adjusting the position of the valve members 18*a*', 18*b*' relative to the outlets 14*a*', 14*b*'. The first flow control valve 9 remains closed.

Control to Output Blended Cold Water and Hot Water

With the mixer valve 1 in the closed position, the first actuator 22 and second actuator 22' position their respective spools 19 and 19' such that the valve members 18*a*, 18*b* and 18*a*', 18*b*' of the first and second flow control valves 9, 10 are sealed against their respective valve seats 15 and 15' to prevent flow of water to the outlet 8.

When water having a temperature between full cold and full hot is required by the user, the actuators 22, 22' of both flow control valves 9, 10 are operated to open both flow control valves 9, 10 together to deliver a mixture of hot and cold water to the outlet 8. The temperature and/or flow rate of the mixed water can, as an example, be adjusted as follows:

Adjust Flow Control Valves Independently to Adjust Temperature and Flow Rate

With both flow control valves 9, 10 open, the actuator 22 is operated to move the valve member assembly 12 of the first flow control valve 9 to open further the first flow control valve 9 and the actuator 22' is kept stationary. The flow of cold water increases and the flow of hot water remains the same resulting in an increase in flow rate and a decrease in temperature of the outlet water.

With both flow control valves 9, 10 open, the actuator 22 is operated to move the valve member assembly 12 of the first flow control valve 9 towards the closed position and the second actuator 22' is kept stationary. The flow of cold water reduces and the flow of hot water remains the same resulting in a decrease in flow rate and an increase in temperature of the outlet water.

With both flow control valves 9, 10 open, the actuator 22 is kept stationary and the actuator 22' is operated to move the valve member assembly 12' of the second flow control valve 10 to open further the flow control valve 10. The flow of cold water remains the same and the flow of hot water increases resulting in an increase in flow rate and an increase in temperature of the outlet water.

With both flow control valves 9, 10 open, the actuator 22 is kept stationary and the actuator 22' is operated to move the valve member assembly 12' of the second flow control valve 10 towards the closed position. The flow of cold water remains the same and the flow of hot water reduces resulting in a decrease in flow rate and a decrease in temperature of the outlet water.

Adjust Flow Control Valves Together to Change Flow Rate and Maintain Temperature With both flow control valves 9, 10 open, the temperature of the outlet water can be kept substantially constant while changing the flow rate by operating the first and second actuators 22, 22' together to move the valve member assemblies 12, 12' of both flow control valves 9, 10 in the same direction by the same amount so that the ratio of cold water to hot water delivered to the mixing chamber 11 remains substantially constant thus maintaining a constant temperature of the outlet water with a change in flow rate of the outlet water.

Thus, with both flow control valves 9, 10 open, if both valve member assemblies 12, 12' are moved to open further the flow control valves 9, 10 the flow rate will increase, and if both valve member assemblies 12, 12' are moved towards the closed position the flow rate will decrease without changing the temperature of the outlet water.

Adjust Flow Control Valves Together to Change Temperature and Maintain Flow Rate With both flow control valves 9, 10 open, the flow rate can be kept substantially constant while changing the temperature by operating the first and second actuators 22, 22' together to move the valve member assemblies 12, 12' of both flow control valves 9, 10 in opposite directions by the same amount so that the ratio of cold water to hot water delivered to the mixing chamber 11 changes but the total volume of water remains the same thus maintaining a constant flow rate with a change in temperature of the outlet water.

Thus, with both flow control valves 9, 10 open, if the valve member assembly 12 of the first flow control valve 9 is moved to open further the first flow control valve 9 while simultaneously the valve member assembly 12' of the second flow control valve 10 is moved towards the closed position, the flow rate will remain the same but the temperature of the outlet water will decrease.

Similarly, with both flow control valves 9, 10 open, if the valve member assembly 12' of the second flow control valve 10 is moved to open further the second flow control valve 10 while simultaneously the valve member assembly 12 of the first flow control valve 9 is moved towards the closed position, the flow rate will remain the same but the temperature of the outlet water will increase.

As will be apparent from the description of the exemplary embodiment of mixer valve 1 shown in FIGS. 1 to 4, the configuration of the valve member assemblies 12, 12' of the flow control valves controlling the flow of cold water and hot water to the mixing chamber is such that the valve member assemblies 12, 12' are essentially "force balanced" with respect to the fluid flow. In other words, substantially no net force is exerted on the valve member assemblies 12, 12' by the fluid flow and the actuating force to move the valve member assemblies 12, 12' for operating the flow control valves 9, 10 when controlling the mixer valve 1 is substantially independent of fluid flow.

As a result, the actuating force can be reduced compared to valves where there is a significant imbalance of the forces due to fluid flow. Thus, the actuating force to move the valve member assemblies 12, 12' only has to overcome factors such as friction between the valve seats 15 and the seals 20*a*, 20*b*, 20*a*', 20*b*' on the valve members 18*a*, 18*b*, 18*a*', 18*b*' and between the spools 19, 19' and the bores 21, 21' and between the spool connector portions 23, 23' and the seals 24, 24'.

By way of example only, in many water supply systems and installations in the United Kingdom the water pressure is in the range 1 to 10 bar and is typically around 3 bar. If a single valve member is used to control flow through an opening, there is a force imbalance across the valve member due to fluid flow which has to be overcome by the actuating force in addition to any other factors such as friction. For an opening have a diameter of 9 mm this force imbalance is approximately 60 Newtons at a water pressure of 10 bar and approximately 18 Newtons at a water pressure of 3 bar.

By replacing a single opening with a diameter of 9 mm with two openings each having a diameter of 6 mm we can achieve similar flow rates to that provided by the single opening of larger diameter and, by balancing the effect of fluid flow on the valve members, we can reduce the size (power) of the stepper motors required to move the valve members as the stepper motors no longer have to overcome the force imbalance that exists when using a single valve member.

Thus by employing force balanced valve assemblies, not only can the size of the flow control openings be reduced but the size of the stepper motors to drive the valve assemblies can also be reduced. This in turn also enables the overall size of the mixer valve 1 to be reduced.

Figure 12:
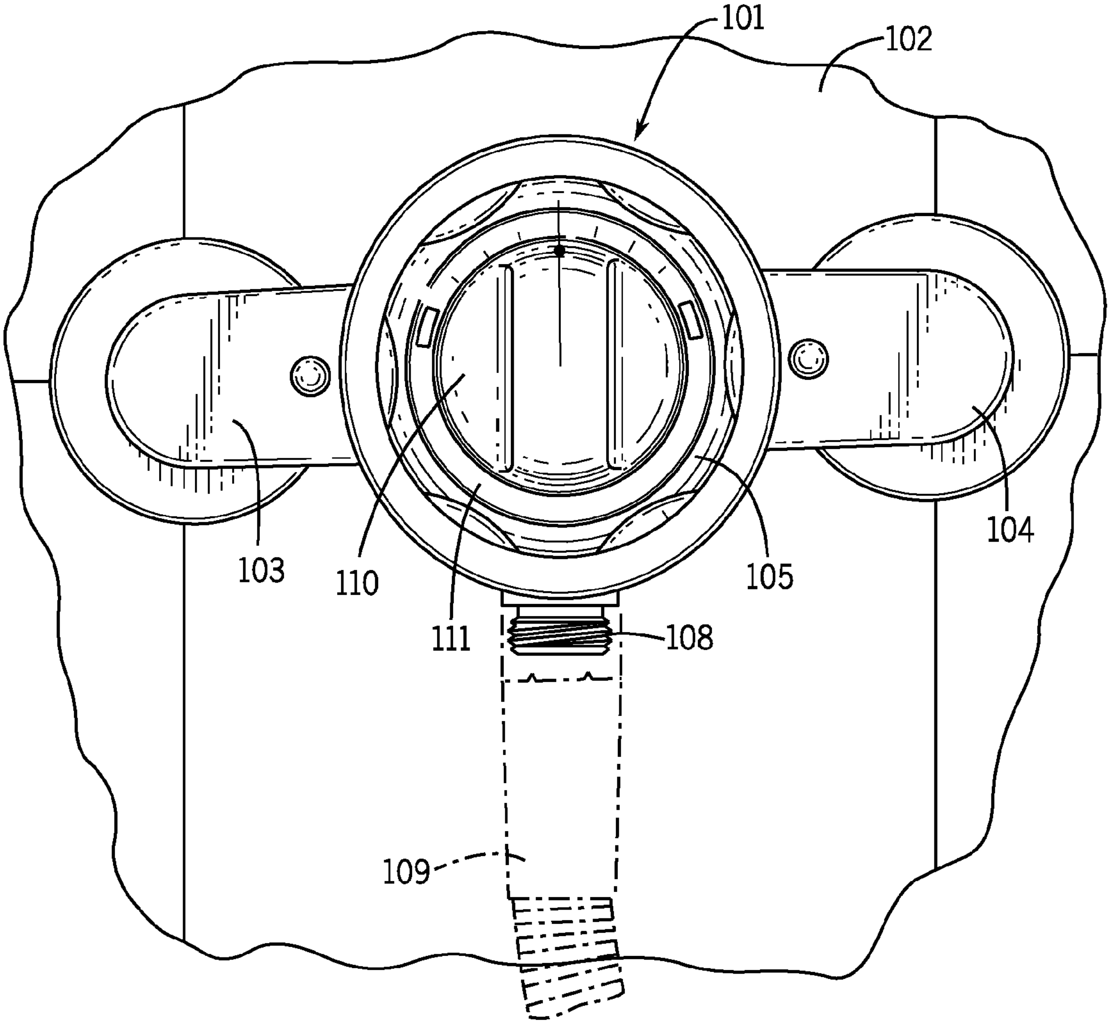
FIG. 12 shows a front view of a prior art mixer valve.
Figure 13:
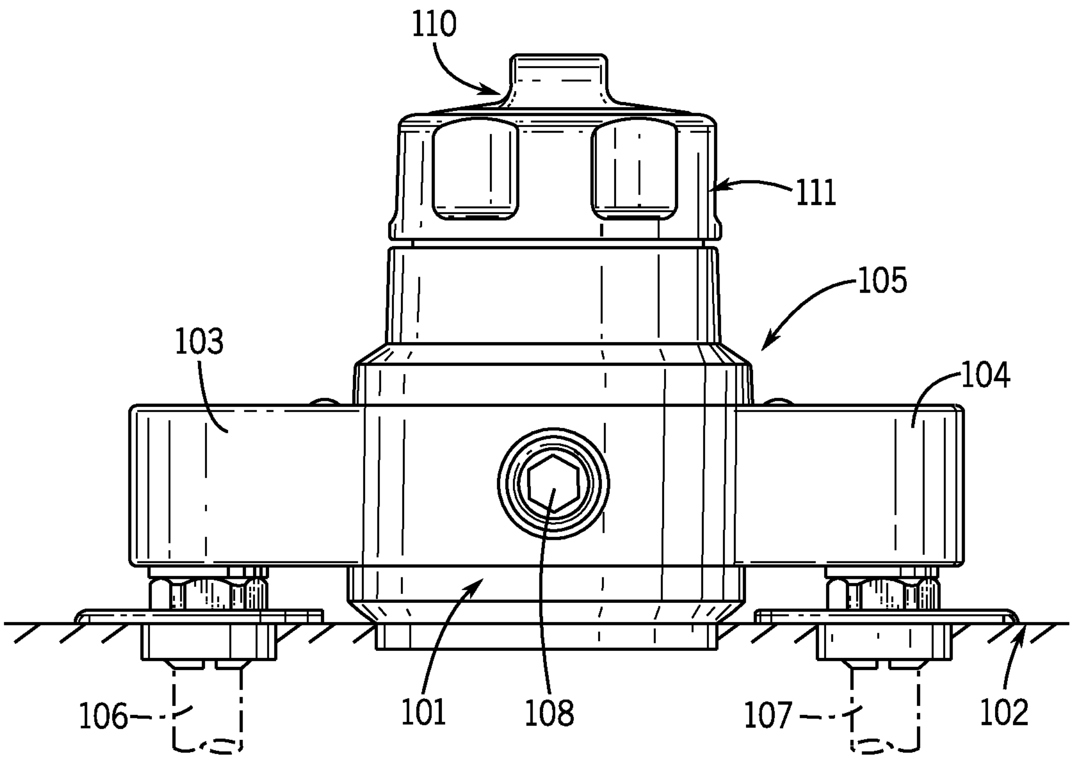
FIG. 13 shows an underneath plan view of the prior art mixer valve of FIG. 12.
Figure 14:
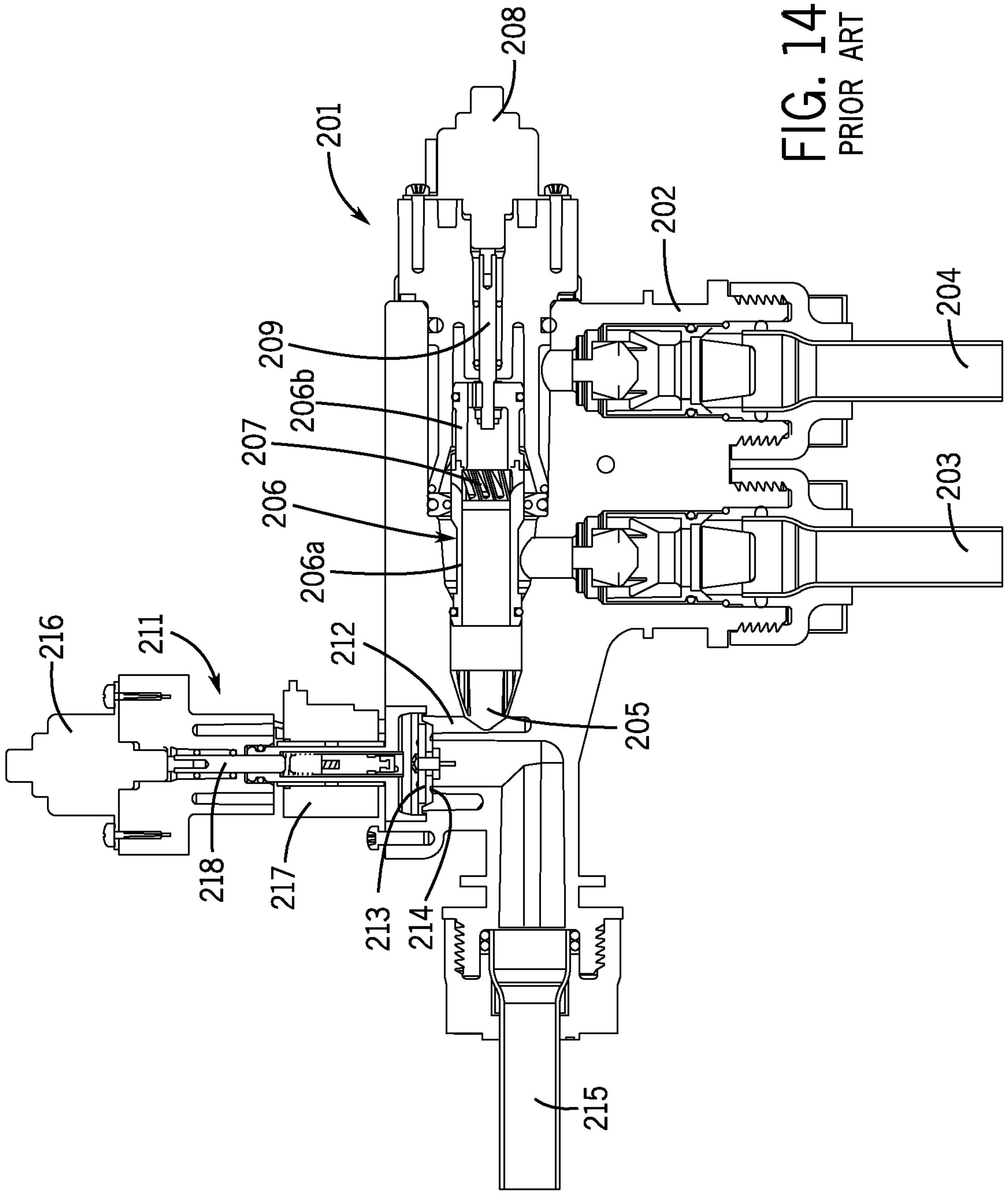
FIG. 14 shows a side view of a prior art electronic mixer valve.
Figure 15:
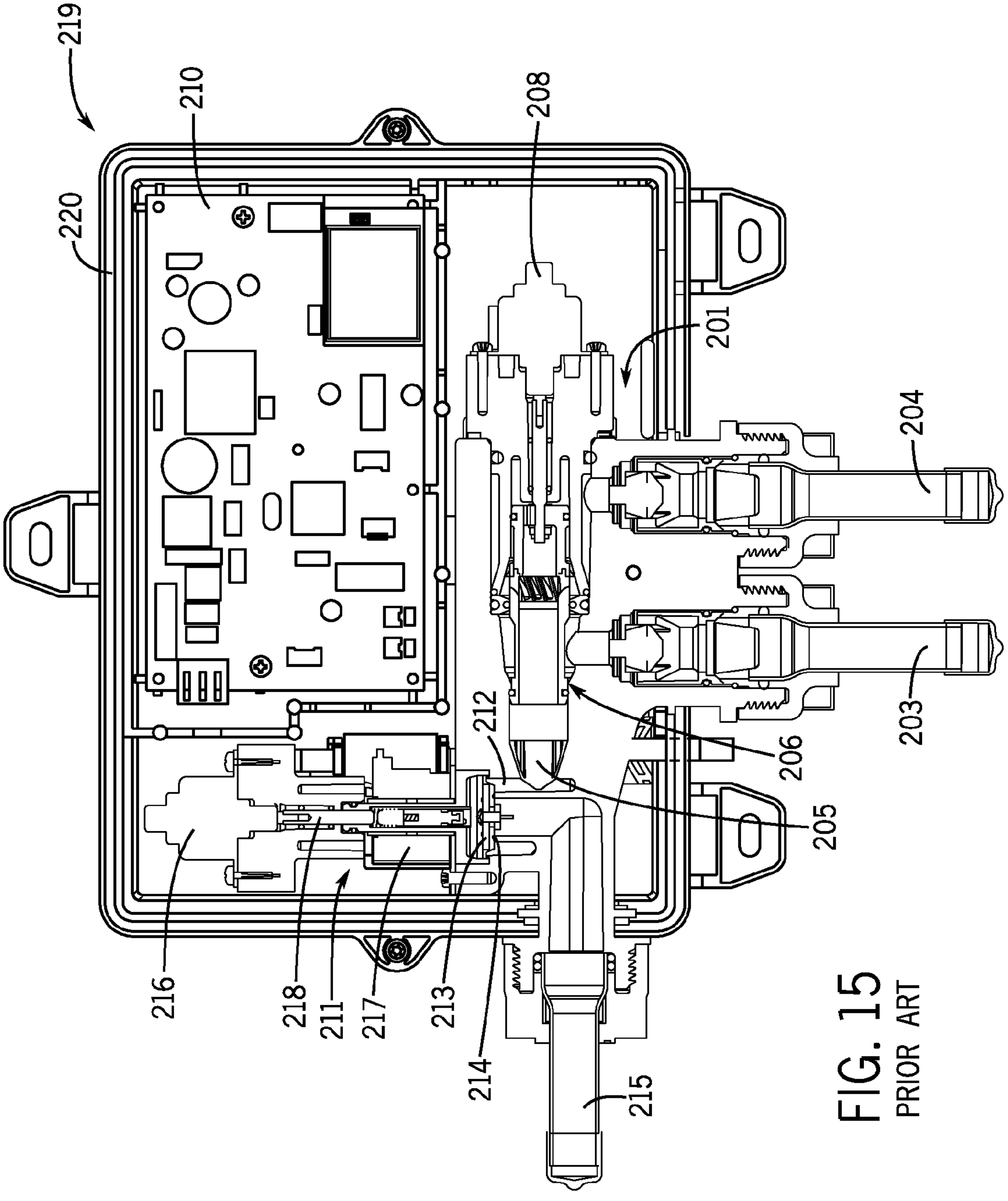
FIG. 15 shows a side view of a unit containing the prior art electronic mixer valve shown in FIG. 14.

Again by way of example, using flow control openings having a diameter of 6 mm we can achieve a reduction in size of the mixer valve whereby the housing 2 may have dimensions of 65 mm×30 mm×15 mm. By way of comparison prior art mixer valves as shown in FIGS. 12 and 13 typically have dimensions of around 180 mm×130 mm×85 mm while prior art electronic mixer valves as shown in FIGS. 14 and 15 that control temperature only and require separate control of flow rate typically have dimensions of around 230 mm×210 mm×55 mm.

By reducing the size of the mixer valve 1, the size of the waterways within the mixer valve 1 and thus the volume of water present in the mixer valve 1 and the available surface area in contact with the water for bio-film to form and bacteria to grow can be reduced. Furthermore, by reducing the size of the mixer valve, it may be possible to manufacture the mixer valve, especially parts of the housing 2 forming the waterways and the flow control valves 9, 10 within the waterways, from metal rather than plastics. In particular, parts that come into contact with the water within the mixer valve can be made of brass. Brass contains copper that kills present bacteria in the water thereby reducing and possibly eliminating the formation of bio-films on the surface of the waterways and flow control valves 9, 10.

A further benefit of reducing the size of the waterways within the valve is that the occurrence of trapped areas where water may collect and allow bacteria to grow and/or form bio-films on surfaces within the valve may be reduced. Also the waterways may be configured to promote turbulent flow and high flow velocity through the valve. This is not only desirable for mixing the hot and cold flows for accurate sensing of the temperature of the outlet water but also assists in preventing formation of bio-films on the exposed surfaces of the waterways within the valve and may even assist in removing any bio-films that are formed, for example as may occur when the valve is not in use, i.e. when there is no flow of water through the valve, and bacteria present in the water remaining in the valve from the previous use of the valve may grow and attach to the exposed surfaces.

To further reduce the health risk from bacteria present in the water, it may be desirable to carry out a disinfection routine at regular intervals to kill and remove (or reduce to acceptable levels) any bacteria and bio-film within the valve. Such disinfection routine may involve fully opening the flow control valve 10 connected to the supply of hot water and passing water at an elevated temperature through the valve 1 for sufficient time to kill and remove any bacteria and bio-film within the valve. Typically this may involve passing water having a temperature of at least 65° C. through the valve for at least 10 minutes although this is by no way limiting and different routines with different water temperatures and/or duration may be employed.

Figure 5:
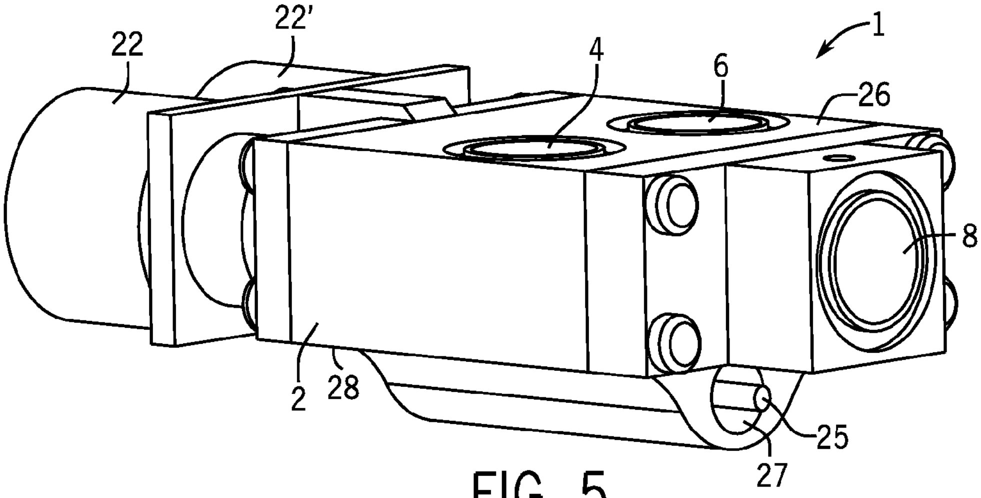
FIG. 5 shows a perspective view of another embodiment of a mixer valve.
Figure 6:
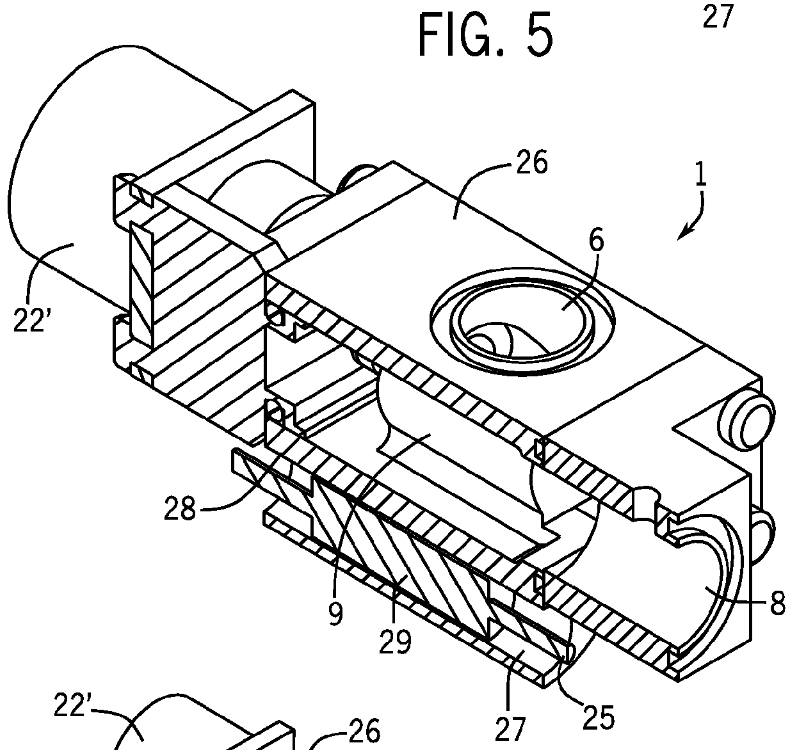
FIG. 6 shows a sectional view of the mixer valve of FIG. 5.

Other disinfection routines may be employed alongside or in place of thermal disinfection with hot water. For example, FIGS. 5 and 6 show a modification to the mixer valve 1 of FIGS. 1 to 4 to include an electrical heater 25 and like reference numerals are used to indicate corresponding parts.

The water inlets 4, 6 are provided on one face 26 of the body 2 of the housing and an electrical heater 25 is located in a bore 27 within the body of the housing 2 on the opposite face 28 and is surrounded by a thermally conductive potting compound 29 for transferring heat from the heater 25 to the metal body of the housing 2. The use of electrical heating for the disinfection routine is suitable as the valve 1 already has an electrical supply for operating the actuators.

The heater 25 may be employed in a thermal disinfection cycle to heat the metal parts of the housing 2 and the flow control valves 9, 10 within the housing 2 (one only shown in FIG. 6) that contact the water to an elevated temperature sufficient to kill any bacteria present in the water and/or any bio-film formed on the exposed surfaces of the waterways within the valve. By reducing the size of the valve 1, the thermal mass of the metal parts to be heated may be significantly reduced and a low power electrical heater (approximately 10 watt) may be sufficient to heat the metal parts of the housing 2 and flow control valves 9, 10 to an elevated temperature of 70° C. to 80° C. for 5 minutes which may be sufficient for this purpose.

An advantage of this method compared to the thermal disinfection with hot water is that all of the metal parts of the housing and the flow control valves 9, 10 are heated whereas thermal disinfection with hot water may not be effective in those areas that do not come into contact with the hot water supply. A temperature sensor (not shown) such as a thermistor may be provided to monitor the temperature during the disinfection cycle and control the power input to the electrical heater 25 to control the disinfection temperature and prevent overheating the housing 2 and flow control valves 9, 10 which may damage any parts not made of metal such as the seals.

The housing 2 is preferably insulated so that exposed external surfaces are not heated to a high temperature. In this way, the risk of a user touching any part of the valve that has been heated to the elevated temperature used for the disinfection routine may be reduced and possibly eliminated. Such insulation also improves the efficiency of the thermal disinfection cycle by reducing heat loss to the environment and may allow use of a lower power heating element.

The valve 1 may be disabled during the disinfection cycle to prevent discharge of water from the outlet while the metal parts of housing 2 and flow control valves 9, 10 are being heated during the disinfection cycle and/or while they are cooling down after the disinfection cycle. Thus, operation of the mixer valve 1 may be prevented during the disinfection cycle and for an interval of time after the disinfection cycle is completed to allow the valve 1 and any water in the valve to cool down and prevent very hot water being discharged when the valve is next used. In this way the risk of a user being scalded by very hot water may be reduced and possibly eliminated.

The controller may respond to initiation of the disinfection cycle to prevent operation of the valve until it is safe. Thus, the temperature sensor for controlling the electrical heater (or a separate sensor) may provide feedback of temperature to the controller so that the valve is not operable until the metal parts of the housing 2 and flow control valves have cooled down to a safe temperature. Also the sensor monitoring the outlet water temperature (or a separate sensor) may provide feedback of temperature to the controller so that the valve is not operable until the water in the valve has cooled down to a safe temperature. Any suitable form of electrical heating may be employed.

Figure 7:
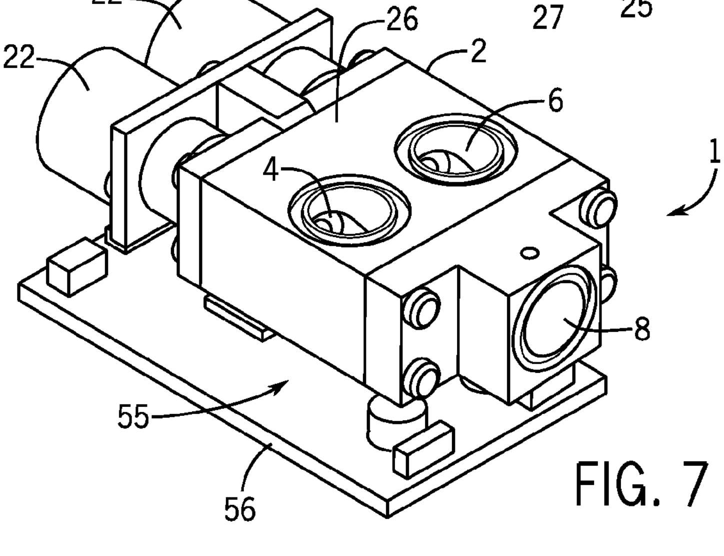
FIG. 7 shows a perspective view of another embodiment of a mixer valve.

Referring now to FIG. 7, a mixer valve 1 is shown with a controller 55 for controlling operation of the valve 1. The mixer valve 1 is similar to previous embodiments and like reference numerals are used to indicate similar parts. The controller 55 provides control signals to control actuation of the actuators 22, 22' of the first and second flow control valves (not visible) to adjust the positions of the valve member assemblies (not visible) to control the flow rate and temperature of the outlet water delivered to the outlet 8 as described previously.

The controller 55 may be an electronic controller with control circuitry that may include a microprocessor or similar electronic controller mounted on a control panel 56 such as a printed circuit board. The controller 55 may include an interface (not visible) to allow a user to select a required flow rate and/or temperature of the outlet water. The interface may be a physical interface including one or more rotatable knobs or linear sliders or push buttons for selecting flow rate and/or temperature. Alternatively, the interface may be a virtual interface that uses touch screen technology or the like. The interface may include a display for providing a visual indication of the flow rate and/or temperature. The display may be a digital display of numerical values and/or visual display such as an array of lights. The controller 55 receives the user's setting from the interface and sends control signals to the actuators 22, 22' to operate the flow control valves as described in connection with previous embodiments to achieve the selected temperature and flow rate of the outlet water.

Figure 16:
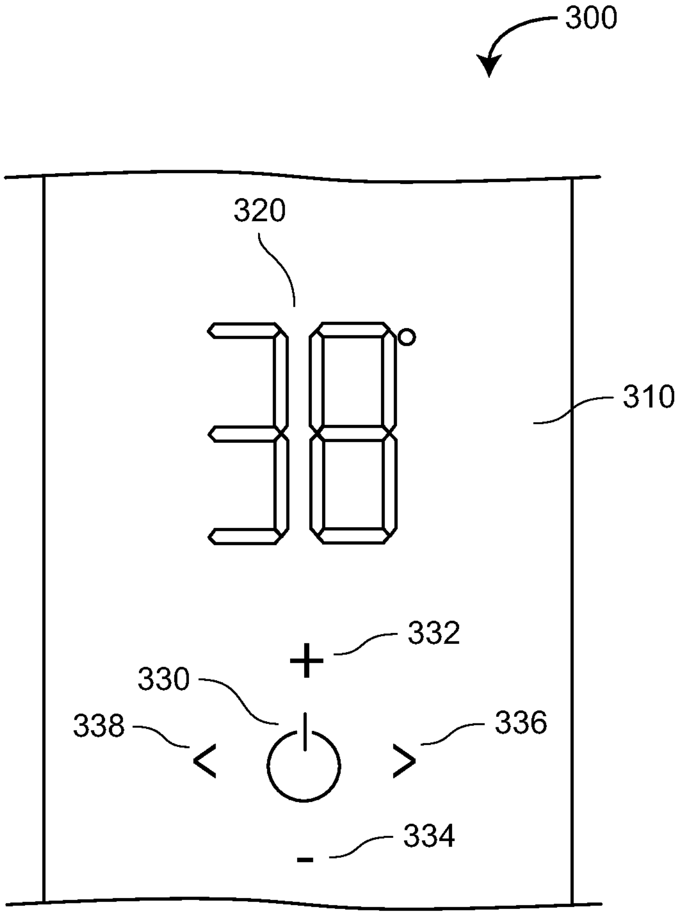
FIG. 16 shows a portion of a plumbing fixture that includes a user interface for controlling the operation of the plumbing fixture.

One example of an interface such as that described in the preceding paragraph is illustrated in FIG. 16. As illustrated, a plumbing fixture 300 (e.g., a shower head, faucet, tub spout, etc.) that includes, for example, an interface 310 (i.e., a user interface) in the form of a touchscreen that includes a display 320 (illustrated as showing a current temperature of water, such as the current temperature of water exiting a plumbing fixture or other component), an on/off switch 330, and controls 332, 334, 336, and 338. The display can be configured to display any of a variety of information (e.g., the temperature in degrees Fahrenheit or degrees Celsius of hot and cold water entering a mixing valve, the temperature of water leaving the mixing valve or of a spout or other structure, the flow rate of water leaving the mixing valve or of a spout or other structure, or other values that may be relevant to the user's use of the interface in conjunction with the plumbing fixtures and fittings described in the present application). The on/off switch may be used to switch on and off the display of the interface and/or may be used to turn on and off the flow of water or other fluid from the plumbing fixture, plumbing fitting, etc. The controls 332, 334, 336, and 338 may be configured to allow a user to adjust the flow rate and/or temperature of the water. For example, controls 332 and 334 may be configured to allow a user to increase or decrease temperature of water provided by a faucet, and controls 336, 338 may allow the user to adjust the flow rate of that water. According to another exemplary embodiment, controls 332 and 334 may be configured to allow a user to increase or decrease the flow rate of the water and controls 336, 338 may allow the user to adjust the temperature of that water. Of course, according to other exemplary embodiments, an interface may include only one of temperature or flow control (e.g., only temperature control, only flow control) such that the other of temperature or flow control may be provided by other components (e.g., faucet handle(s), remote controllers, etc.). According to other exemplary embodiments, the interface may include mechanical switches and/or knobs instead of utilizing a interface. Also, in addition to the functions described above, the interface can include controls for other features (e.g., to initiate, stop, and control a cleaning or disinfecting cycle for the mixing valve and/or plumbing fixture, as described herein, for example, with respect to an embodiment in which the mixing valve includes a heating element for heating a body of the mixing valve).

According to various exemplary embodiments, the interface 310 may be provided in any desired location (e.g., on or coupled to a surface, such as an outer surface, of the plumbing fixture (e.g., on a spout or escutcheon of a faucet, etc.), at a location remote from the plumbing fixture and in communication with the mixing valve, which may be within the plumbing fixture our outside of the plumbing fixture, etc.). For example, examples of possible locations are shown, for example, in FIGS. 9*a*-9*b* and FIG. 11*a*, although it should be understood that other locations are possible according to other exemplary embodiments. For example, the portion of the plumbing fixture 300 illustrated in FIG. 16 may be a handle of a shower head such as the shower head 50 shown in FIG. 8*a*, which would allow a user to use one hand both to manipulate the shower head and to control the flow rate and/or temperature (e.g., the interface may be accessible on an outer surface of the stem or handle of the shower head or on a spray head of the shower head). According to another exemplary embodiment, the portion of the plumbing fixture 300 illustrated in FIG. 16 may be a spout or other component of a faucet. According to another exemplary embodiment, the interface may be positioned remotely from the plumbing fixture but may be configured to communicate with a controller to control the mixing valve for the plumbing fixture that is located within the plumbing fixture.

The controller 55 may be programmable and may include a memory for storing different settings of temperature and/or flow rate of the outlet water that may be set via the interface and selected by a user via the interface. The controller 55 may allow selection of a disinfection cycle and may collect and store details of the disinfection cycle. For example, in plumbing fixtures and fittings and water supply systems and installations that require regular disinfection, the memory may record when the disinfection cycle is carried out and the temperature of the outlet water and the duration of the disinfection cycle which may be used to check that the disinfection routine has been carried out and has been successful.

The interface may be incorporated into the plumbing fixture or fitting. Alternatively or additionally, the interface may be incorporated into a remote control that communicates with the controller 55 via a wired or wireless connection. For example, where the mixer valve 1 is incorporated in a plumbing fixture or fitting that, in use, is out of reach of the user, the controller 55 may receive control signals via a wired or wireless link from an interface mounted remotely from the mixer valve 1. In one form of wireless link, the interface may include a wireless transmitter and the controller may include a wireless receiver to receive control signals, for example radio frequency signals, representative of a user's selected input via the interface.

By reducing the size of the mixer valve 1, the mixer valve 1 may be configured for supplying water for a range of different applications including hand washing, showering and bathing. Thus mixer valves for supplying water for hand washing may typically be required to have a flow coefficient (C-value) of 0.5 to 1.0 corresponding to flow rates of 5 to 10 liters per minute at a pressure of 1 bar, while mixer valves supplying water for showering may typically be required to have a flow coefficient of 1.0 to 3.0 corresponding to flow rates of 10 to 30 liters per minute at a pressure of 1 bar and mixer valves for supplying water for bath filling may typically be required to have a flow coefficient of 3.0 to 5.0 corresponding to flow rates of 30 to 50 liters per minute at 1 bar.

We have found that using flow control openings have a diameter of 6 mm we can achieve a flow coefficient (C-value) of around 2.5 corresponding to a flow rate of 25 liters per minute at 1 bar when both flow control valves 9, 10 are in the mid-open position (FIG. 4). In this way, the mixer valve 1 can meet the flow requirements for hand washing, showering and bath filling.

The flow rates for showering are provided when both flow control valves 9, 10 are opened to the mid-open position (FIG. 4) and controlling temperature without changing flow by reducing flow of one supply and increasing flow of the other supply by the same amount or controlling flow without changing temperature by either reducing or increasing flow of both supplies by the same amount. Flow rates for hand washing may be achieved by opening both flow control valves 9, 10 less than the mid-open position (FIG. 4) and controlling temperature and/or flow rate as for showering. Higher flow rates for bath filling can be achieved by fully opening both flow control valves 9, 10 and controlling temperature by reducing flow of the hot or cold water as necessary.

These flow rates and dimensions are provided by way of non-limiting example and it will be understood that different flow rates and dimensions may be employed where appropriate for the intended application of the mixer valve.

Various control routines may be employed for operating the mixer valve 1 depending on the application. Routines for showering and bath filling are now described. These are examples only of possible routines and are not intended to be exhaustive of all possible routines which may be used when operating the mixer valve 1.

Routine for Showering

The valve member assemblies 12, 12' of the first and second flow control valves 9 and 10 are both moved simultaneously and equally to the mid-open position (50% actuator travel) shown in FIG. 4 by their respective actuators 22, 22' to provide a nominal flow rate.

To change the flow rate without changing the temperature of the outlet water, both valve member assemblies 12, 12' are simultaneously moved from the mid-open position (FIG. 4) in the same direction either towards the closed position to reduce flow rate or towards the open position to increase flow rate while maintaining the ratio of hot and cold water to keep the temperature of the outlet water constant.

Further changes to increase or decrease flow from any adjusted position without changing the temperature of the outlet water can be made in similar manner.

To change the outlet water temperature without changing the flow rate from the nominal flow (50% of actuators travel position) starting point, the valve assemblies 12, 12' are simultaneously moved in opposite directions to increase one flow whilst simultaneously reducing the other flow by an equal amount. By operating the first and second flow control valves 9, 10 in this way, the ratio of the hot and cold water is changed but the total flow remains the same so that the temperature of the outlet water can be adjusted without substantially affecting the flow rate.

Both temperature and flow rate can be adjusted in use by a combination of movement of the valve member assemblies to change the flow rate and the temperature and/or to maintain a selected flow rate or temperature.

Routine for Bath Filling

The valve member assemblies 12, 12' of the first and second flow control valves 9, 10 are both moved to the fully open positions (100% actuator travel) to achieve the maximum flow rate.

Temperature is then controlled by reducing the flow of hot water if the temperature of the outlet water needs to be reduced by moving the valve member assembly 12' of the second flow control valve 10 towards the closed position or by reducing the flow of cold water if the temperature of the outlet water needs to be increased by moving the valve member assembly 12 of the first flow control valve 9 towards the closed position.

Although such adjustment changes the flow rate as well as the temperature of the outlet water, such change is acceptable in the context of bath filling where the user is typically not exposed directly to the flow of water from the outlet as is usually the case when showering where changes to flow and temperature are readily detected and greater control is required, particularly to reduce the risk of scalding by very hot water.

By reducing the size of the mixer valve 1, it may be possible to employ the mixer valve 1 in situations where it has not previously been possible to use existing mixer valves. In particular, the small size of the mixer valve 1 as discussed herein opens up the possibility of incorporating the mixer valve into a wide range of plumbing fixtures and fittings that could not incorporate existing mixer valves due to their size and other constraints on the design and installation of such plumbing fixtures and fittings.

The mixer valve 1 may also be used to replace mixer valves employed in existing plumbing fixtures and fittings. Here the small size of the mixer valve 1 may allow the size of such existing plumbing fixtures and fittings to be reduced and/or the shape to be altered.

Thus, the mixer valve 1 increases the freedom of designers when designing plumbing fixtures and fittings and water supply systems and installations incorporating such plumbing fixtures and fittings that incorporate the mixer valve 1. Various examples of plumbing fixture and fittings incorporating the mixer valve 1 are now described. These are examples only of possible applications of the mixer valve 1 and are not intended to be exhaustive of all possible applications in which the mixer valve 1 may be incorporated in a plumbing fixture or fitting.

Figure 8A:
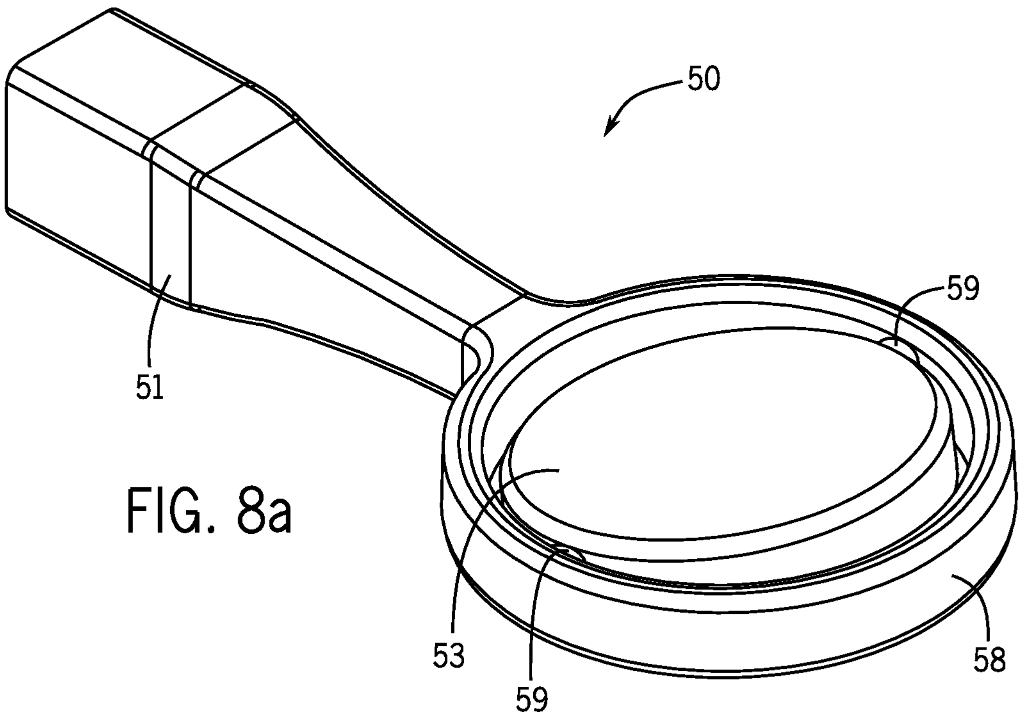
FIG. 8*a* shows a plumbing fitting comprising a shower head incorporating an embodiment of the mixer valve disclosed herein.
Figure 8B:
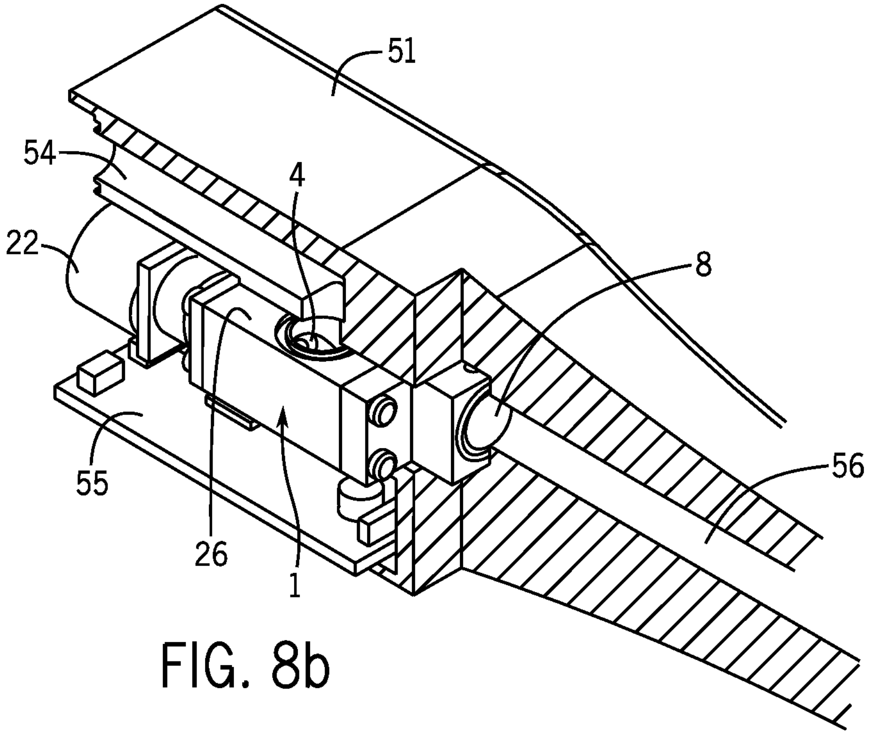
FIG. 8*b* shows a cut-away view of the shower head shown in FIG. 8*a* showing the mixer valve therein.

Referring to FIGS. 8*a* and 8*b*, an embodiment of a plumbing fitting 50 comprising a fluid delivery device such as a shower head incorporating a mixer valve 1 is shown. The mixer valve 1 is similar to previous embodiments and like reference numerals are used to indicate corresponding parts.

The shower head 50 comprises a moveable handset and includes a stem 51 that can be inserted into a shower head dock within a shower enclosure (not shown). The shower head 50 could alternatively be a fixed shower head that is arranged to be fixed to and project from a wall.

The shower head 50 includes a spray head 53 that provides a plurality of outlets for discharge of water in use to provide a variety of different spray patterns. In one arrangement, the spray head 53 has outlets in opposite sides and optionally on one or more side edges. The spray head 53 can rotate within a substantially circular spray head mount 58 about diametrically opposed pivots 59 to select an outlet for use.

According to other exemplary embodiments, other types of spray heads may be used, including those that are configured to provide only a single spray pattern and those that operate differently than the spray head 53 shown in FIGS. 8*a* and 8*b* to provide multiple spray patterns.

The shower head stem 51 receives the mixer valve 1 together with the controller 55. The stem 51 includes two conduits—a cold water supply conduit 54 and a hot water supply conduit (not visible). The cold water conduit 54 connects to the first fluid inlet 4 and the hot water conduit connects to the second fluid inlet (not shown) of the mixer valve 1. The fluid outlet 8 of the mixer valve 1 is connected to the spray head 53 by an outlet conduit 56. The outlet conduit 56 extends through the spray head mount 58 and enters the spray head 53 through the pivots 59.

The controller 55 provides control signals to the mixer valve 1 for controlling the flow rate and temperature of the outlet water delivered to the spray head 53 according to the user selection via the interface (not visible). The interface may be arranged on the stem 51 to allow a user to select the flow rate and temperature of the outlet water they wish. The interface may be a physical interface including one or more rotatable knobs or linear sliders or push buttons for selecting flow rate and/or temperature. Alternatively, the interface may be a virtual interface that uses touch screen technology or the like. The interface may include a display for providing a visual indication of the flow rate and/or temperature. The display may be a digital display of numerical values and/or visual display such as an array of lights.

In other embodiments, the interface may be incorporated into a remote control that communicates with the controller 55 via a wired or wireless link. Thus, if the shower head 50 is of fixed type, then the controller 55 may receive control signals from an interface mounted remotely from the shower head 50.

Figure 9A:
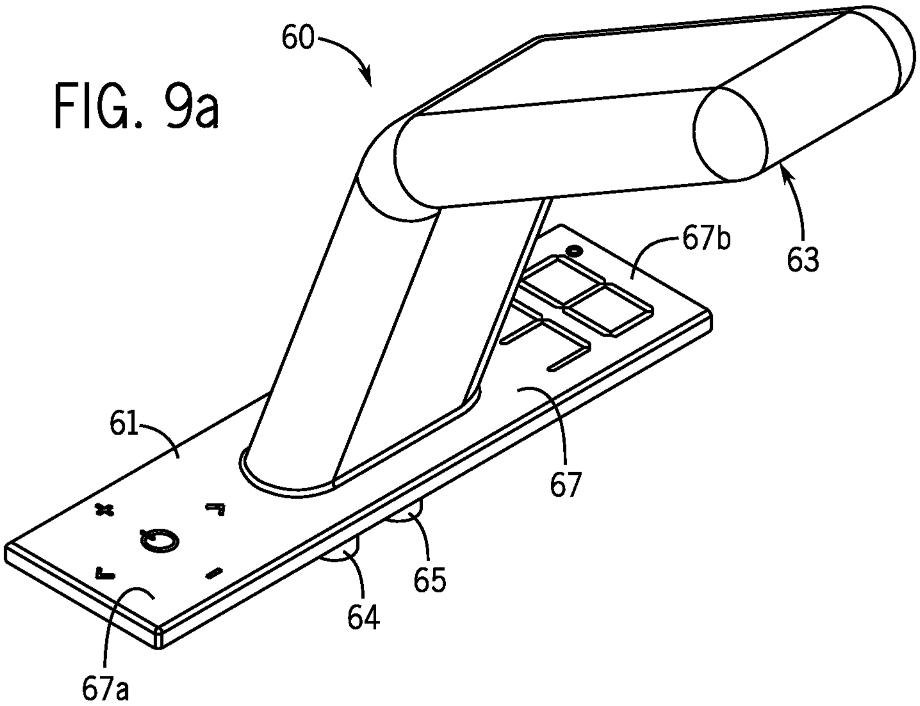
FIG. 9*a* shows a plumbing fitting comprising a faucet incorporating an embodiment of the mixer valve disclosed herein.
Figure 9B:
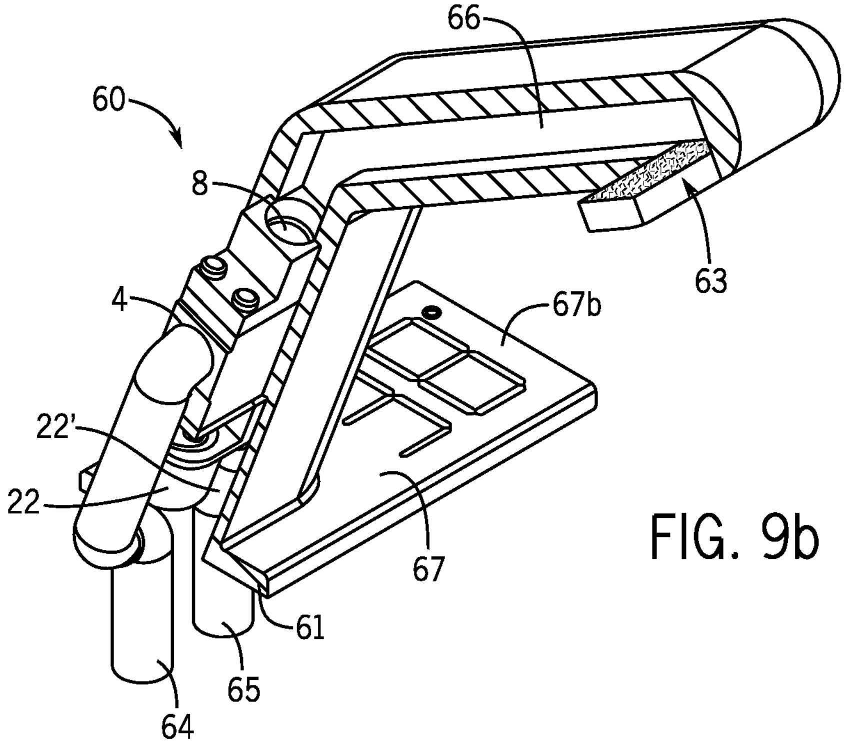
FIG. 9*b* shows a cut away view of the faucet shown in FIG. 9*a* showing the mixer valve therein.

Referring now to FIGS. 9*a* and 9*b*, an embodiment of a plumbing fitting comprising a fluid delivery device such as a faucet 60 incorporating a mixer valve 1 is shown. The mixer valve 1 is similar to previous embodiments and like reference numerals are used to indicate corresponding parts.

The faucet 60 may be in the form of a tap and includes a base 61 by which it is secured to a support surface such as a sink or worktop (such as kitchen or bathroom worktop). The faucet 60 includes a perforated plate 63 that provides an outlet for the water for use. The faucet 60 receives the mixer valve 1 together with the controller 55. The faucet 60 has a stem portion (sometimes referred to as a "spout") and two conduits—a cold water supply conduit 64 and a hot water supply conduit 65. The cold water conduit 64 connects to the first fluid inlet 4 and the hot water supply connects to the second fluid inlet (not visible) of the mixer valve 1. The fluid outlet 8 of the mixer valve 1 is connected to the plate 63 by an outlet conduit 66.

The controller (not shown) provides control signals to the mixer valve 1 for controlling the flow rate and temperature of the outlet water delivered to the plate 63 according to the user selection via an interface 67 on the base 61 to allow a user to select the flow rate and temperature they wish. The interface 67 includes a touch sensitive panel 67*a* for inputting settings and a display 69*b* which shows the water temperature. It will, be appreciated that the interface 67 can be of any suitable form for receiving user inputs for controlling the mixer valve 1. It should also be understood that similar types of user interfaces may be employed either as part of or adjacent to other plumbing fixtures and fitting discussed herein (e.g., on or adjacent to a shower head or a stem thereof, on or adjacent to a tub spout, etc.).

Conventional faucets require a valve base that is secured to the support surface and the spout then extends from the valve base to channel the water to where it needs to be dispensed. The present embodiment is advantageous as the mixer valve, due to its ability to be miniaturized (i.e. reduced in size), can be incorporated into the spout without the need for the valve base. Also the rectangular shape of the housing 2 provides the designer with the opportunity to employ different configurations for the stem portion (spout) of the faucet.

Figure 10:
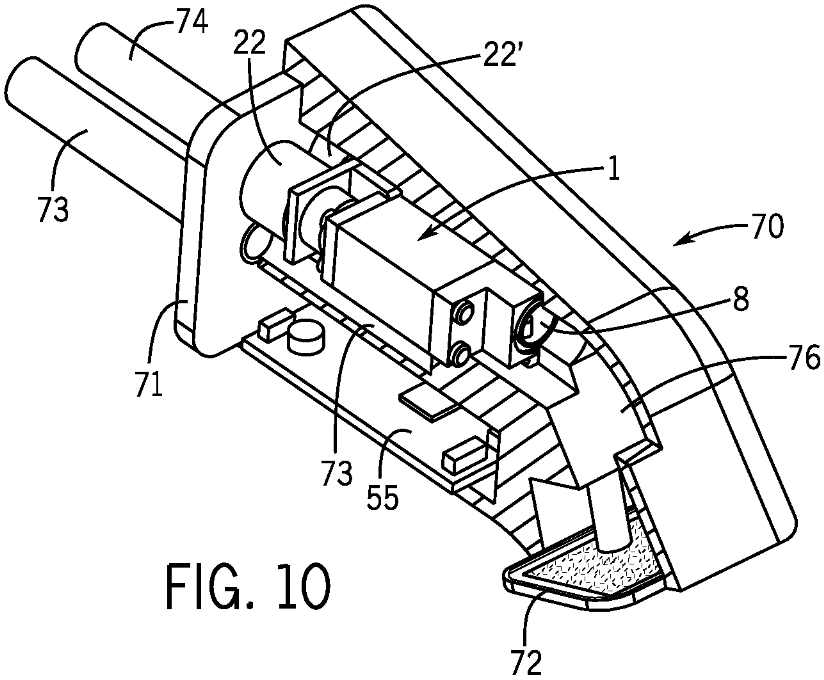
FIG. 10 shows a further plumbing fitting comprising a shower head incorporating an embodiment of the mixer valve disclosed herein.

Referring now to FIG. 10, an embodiment of a plumbing fitting comprising a fluid delivery device such as a fixed shower head 70 incorporating a mixer valve 1 is shown. The mixer valve 1 is similar to previous embodiments and like reference numerals are used to indicate corresponding parts.

The fixed shower head 70 includes a base 71 by which it is secured to a wall or similar support surface within a shower enclosure (not shown). The shower head 70 includes a perforated plate 72 that provides an outlet for the water in use. The shower head 70 receives the mixer valve 1 together with the controller 55. The shower head 70 has two conduits—a cold water supply conduit 73 and a hot water supply conduit 74. The cold water supply conduit 73 is connected to the first fluid inlet (not visible) and the hot water supply conduit 74 is connected to the second fluid inlet (not visible) of the mixer valve 1.

The mixer valve 1 is similar to the embodiment shown in FIGS. 8*a* and 8*b* except that the controller 55 is mounted within the shower head 70 differently such that the supply conduits 73 and 74 pass between the mixer valve 1 and the controller 55. The fluid outlet 8 of the mixer valve 1 is connected to the plate 72 by an outlet conduit 76.

The controller 55 provides control signals to the mixer valve 1 for controlling the flow rate and temperature of the outlet water delivered to the plate 72 according to the user selection via a remote interface (not shown) allowing a user to select the flow rate and temperature they wish. It will be appreciated that the interface can be of any suitable form such as the interfaces disclosed herein for receiving user inputs for controlling the mixer valve 1 and the controller 55 may be arranged to receive control signals from the interface by a wired or wireless link for controlling the actuators 22, 22'.

Figure 11A:
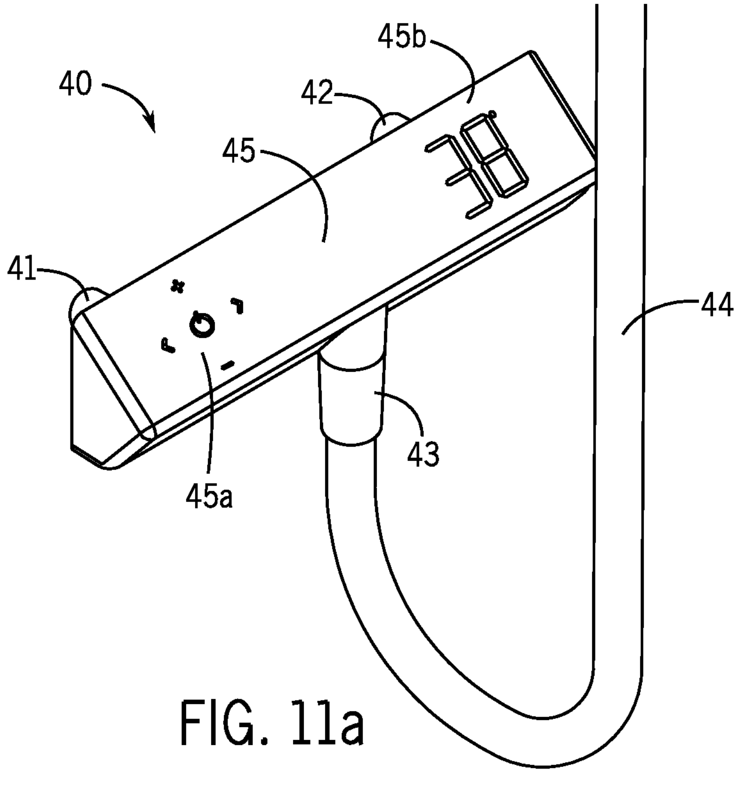
FIG. 11*a* shows a further embodiment of a plumbing fitting comprising a bar mixer assembly incorporating an embodiment of the mixer valve disclosed herein.
Figure 11B:
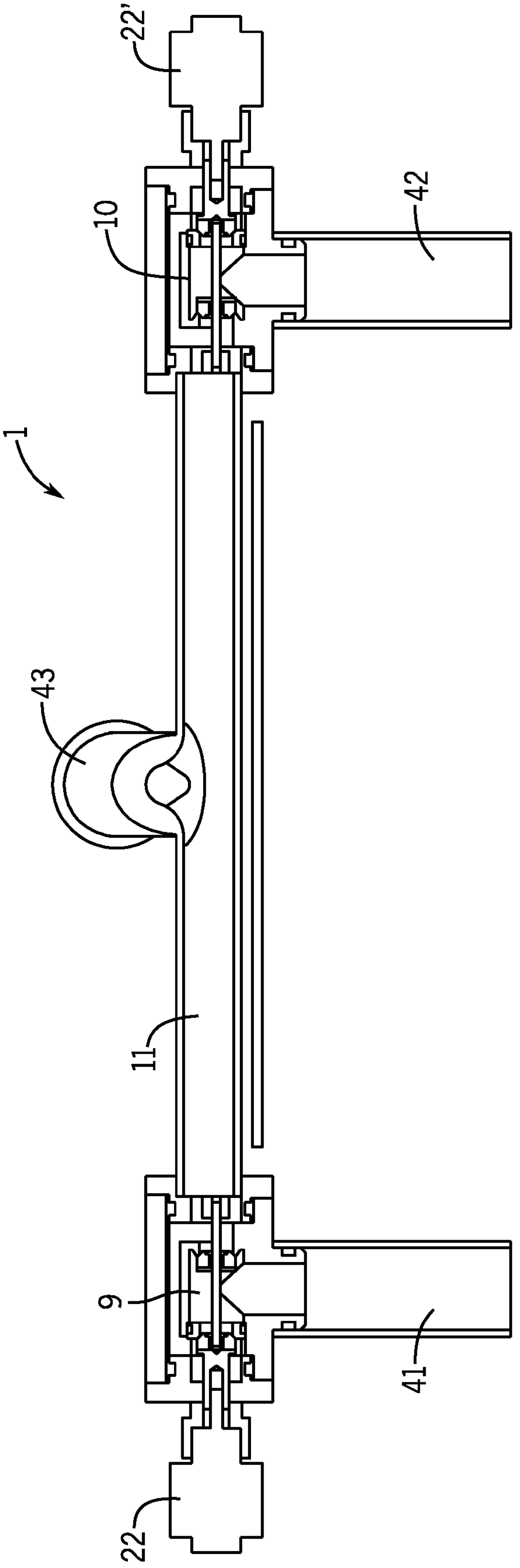
FIG. 11*b* shows a top view of the bar mixer assembly with the control panel removed.
Figure 11C:
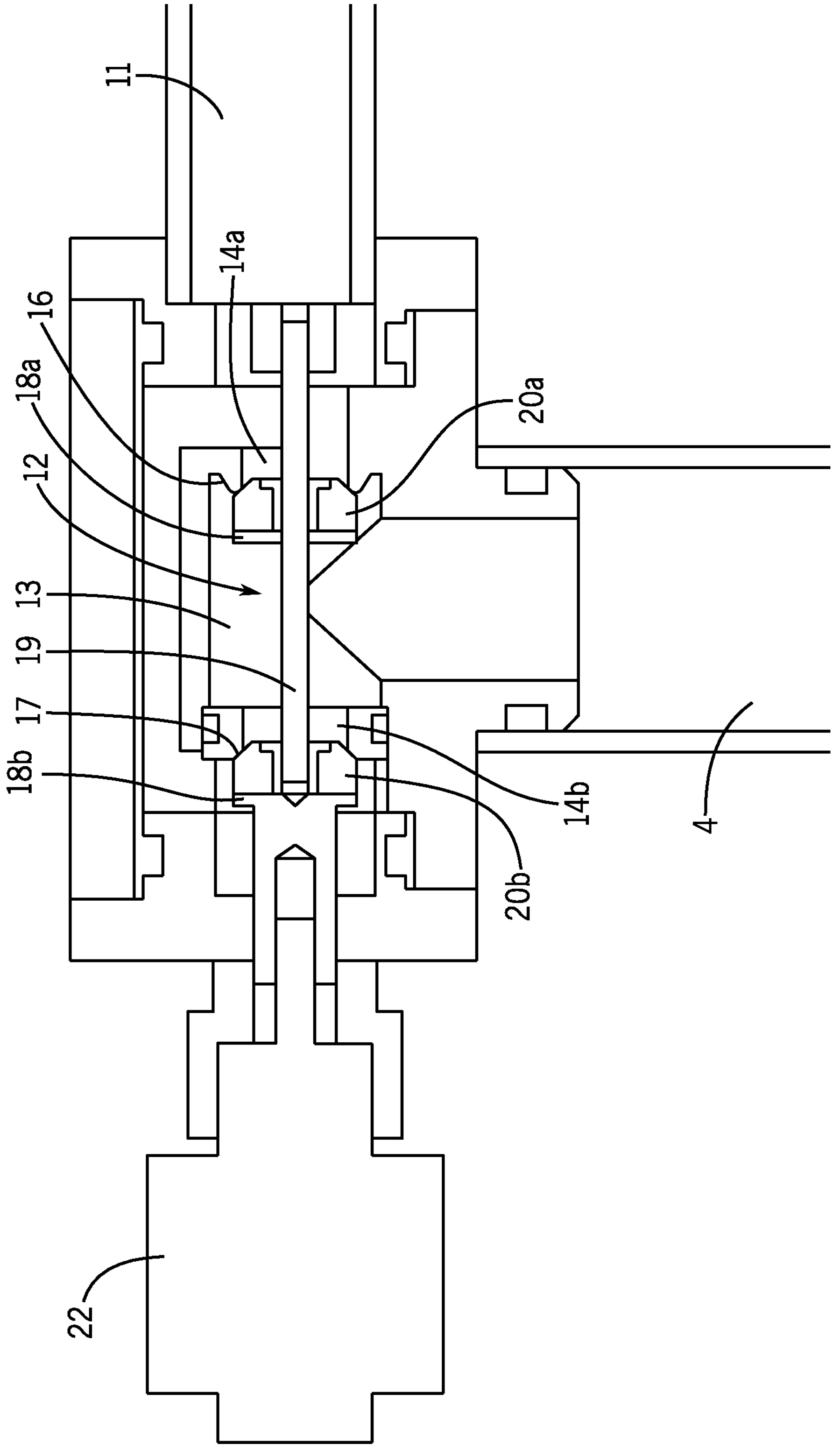
FIG. 11*c* shows a detailed view of one of the flow control valves of the bar mixer assembly shown in FIG. 11*b;*

Referring now to FIGS. 11*a*, 11*b* and 11*c*, an embodiment of a plumbing fitting comprising a shower valve 40 of the bar mixer type that incorporates an embodiment of the mixer valve 1 described herein is shown.

The shower valve 40 comprises a cold water inlet 41, a hot water inlet 42 and a blended water outlet 43. The outlet is connected to a flexible shower hose 44 that leads to a shower head (not shown) or the like. The shower valve 40 includes a control panel 45 which controls the mixer valve 1. The control panel 45 includes controls 45*a* for switching the shower on and off, setting the flow rate and the temperature of the outlet water and also a temperature display 45*b* to display the temperature of the outlet water. The controls 45*a* may include an interface such as the interfaces disclosed herein.

In this embodiment, the mixing chamber 11 includes an elongate structure formed by a conduit with the first flow control valve 9 at one end of the conduit and the second flow control valve 10 at the other, opposed end of the conduit. The valve outlet 43 is formed in the conduit in between the first and second flow control valves 9, 10.

The flow control valves 9, 10 are similar to those described above in relation to the embodiment of FIGS. 1 to 4 and like reference numerals are used to indicate corresponding parts. The first flow control valve 9 is shown in FIG. 11*c* and the following description of the first flow control valve 9 also applies to the second flow control valve 10.

In this embodiment, the flow control valve 9 has a valve member assembly 12 with valve members 18*a*, 18*b* mounted on a spool 19 connected to an actuator 22. The valve members 18*a*, 18*b* carry an elastomeric seal 20*a*, 20*b* that faces in a longitudinal and radial direction. Rather than being received in the centre section of the valve outlets 14*a*, 14*b* in the closed position as in the embodiment of FIGS. 1 to 4, the valve members 18*a*, 18*b* are arranged to engage end sections of the valve outlets 14*a*, 14*b* that provide the valve seats in the closed position shown in FIG. 11*c*.

The valve member 18*a* is disposed within the inlet chamber 13 and engages end section 16 of the valve outlet 14*a* and the valve member 18*b* is arranged in the mixing chamber 11 and engages the end section 17 of the valve outlet 14*b*. The valve inlet chamber 13 receives the water from the inlet 4 and the valve members 18*a*, 18*b* are movable under the control of the actuator 22 to open the flow control valve and control the flow of water from the valve chamber 13 into the mixing chamber 11 in similar manner to the embodiment of FIGS. 1 to 4. The mixing chamber 11 receives water from one or both flow control valves 9, 10 according to the operating routine of the mixer valve 1 as described in connection with FIGS. 1 to 4 and the water leaves the mixing chamber 11 via outlet 43 for use.

The embodiments described above relate to mixer valves. However, the flow control valves 9, 10 could be used individually to control fluid flow. As an example, the control valve 9 shown in FIG. 11*c* could be employed separately from the flow control valve 10 in any application where it is desired to control the flow rate of a water supply.

In such application, the mixing chamber 11 of the shower valve 40 shown in FIG. 11*b* is replaced with an outlet chamber which directs the flow from the outlets 14*a*, 14*b* of the flow control valve 9 to an outlet (not shown) for the intended application. The flow control valve 9 operates to control flow rate in similar manner to previous embodiments. Similarly the flow control valves 9, 10 of other embodiments may be employed separately to control flow rate.

One application for such a flow control valve could be in an instantaneous water heater of the type in which a supply of water is heated as it passes through a heater tank to provide a source of hot water on demand. In such instantaneous water heaters (sometimes referred to as continuous flow water heaters), for a given power input to the heater tank, the temperature of the outlet water is determined by the flow rate of the water through the heater tank and control of flow rate may be used to achieve and maintain a selected outlet water temperature. One application for such water heaters is in an electric shower to supply water to one or more shower outlets such as a handset or fixed shower handset. Other applications of the flow control valve will be apparent to those skilled in the art.

It will be appreciated that while the embodiments of the mixer valve and the flow control valve described herein are shown as being incorporated into plumbing fittings, they have wider application. For example, due to the valve's ability to be miniaturized (i.e. reduced in size) while maintaining a high flow rate for its size it may have advantageous uses in process control valves, pneumatic and hydraulic systems, medical equipment or in automotive components or other components where control of flow rate of a fluid and/or mixing of two fluids having different characteristics is required. Thus, mixing fluids may not be limited to fluids having different temperatures.

As utilized herein, the terms "approximately," "about," "around," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the mixer valves and related assemblies as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Features of any of the embodiments may be employed separately or in combination with any other feature(s) of the same or different embodiments and the disclosure extends to and includes all such arrangements whether or not described herein.

Other substitutions, modifications, changes and omissions may also be made in the design, operating conditions and arrangement of the various exemplary embodiments without departing from the scope of the inventions described herein.

What is claimed is:

1. A plumbing fixture comprising:

a body;

a mixing valve within the body, the mixing valve comprising a first linear actuator for controlling a first flow control valve within the mixing valve and a second linear actuator for controlling a second flow control valve within the mixing valve; and a controller within the body and configured to send control signals to control actuation of the linear actuators;

wherein the plumbing fixture is a faucet and the mixing valve and controller are located within a spout of the faucet;

wherein each of the first flow control valve and the second flow control valve comprises an inlet and a valve member assembly to control the fluid flow through the respective flow control valve; and wherein the valve member assembly and the inlet of each of the first flow control valve and the second flow control valve is configured such that, when in use, fluid flowing through the first flow control valve exerts substantially no net force on the valve member assembly of the first flow control valve and fluid flowing through the second flow control valve exerts substantially no net force on the valve member assembly of the second flow control valve.

2. The plumbing fixture of claim 1, wherein the spout of the faucet is configured to pivot relative to a base of the faucet.

3. The plumbing fixture of claim 1, wherein mixing valve and controller are located above an escutcheon of the faucet.

4. The plumbing fixture of claim 1, wherein the faucet is for use with one of a bath tap, a sink tap, and a basin tap.

5. The plumbing fixture of claim 1, wherein the linear actuators are stepper motors.

6. The plumbing fixture of claim 1, wherein the controller comprises a user interface accessible by a user outside the body of the plumbing fixture.

7. The plumbing fixture of claim 1, further comprising a user interface located on a base of the faucet, wherein the base is configured to be secured to a support surface and support the spout of the faucet.

8. The plumbing fixture of claim 1, wherein the controller includes a microprocessor mounted on a control panel.

9. The plumbing fixture of claim 8, wherein the control panel is a printed circuit board.

10. The plumbing fixture of claim 1, wherein the controller is programmable.

11. The plumbing fixture of claim 10, wherein the controller comprises a memory for storing different settings relating to at least one of temperature or flow rate for the plumbing fixture.

12. The plumbing fixture of claim 1, wherein the mixing valve comprises an electric heating element and the controller is configured to allow selection of a disinfection cycle in which the electric heating element is activated to heat the mixing valve.

13. The plumbing fixture of claim 12, wherein the controller comprises a memory and the memory is configured to record at least one of the time when the disinfection cycle is carried out, the temperature of outlet water, or the duration of the disinfection cycle.

14. A plumbing fixture comprising:

a body;

a mixing valve within the body, the mixing valve comprising a first linear actuator for controlling a first flow control valve within the mixing valve, a second linear actuator for controlling a second flow control valve within the mixing valve, and a mixing chamber, wherein each of the flow control valves comprises two valve outlets in communication with the mixing valve for controlling flow of fluids from the first and second flow control valves to the mixing chamber; wherein the two outlets of each of the flow control valves are substantially the same size; and a controller within the body and configured to send control signals to control actuation of the linear actuators;

wherein the plumbing fixture is a faucet and the mixing valve and controller are located within a spout of the faucet.

15. The plumbing fixture of claim 14, wherein each of the first and second flow control valves comprise an inlet and a valve member assembly to control the fluid flow through the respective flow control valve, the valve member assembly and the inlet of each of the first and second flow control valves configured such that, when in use, fluid flowing through the first flow control valve exerts substantially no net force on the valve member assembly of the first flow control valve and fluid flowing through the second flow control valve exerts substantially no net force on the valve member assembly of the second flow control valve.

16. The plumbing fixture of claim 14, wherein each flow control valve includes a valve member assembly including a first valve member adapted to engage with a first valve seat associated with a first of the two valve outlets in a closed position of the flow control valve and a second valve member adapted to engage with a second, separate, valve seat associated with a second of the two valve outlets in the closed position of the flow control valve.

17. A plumbing fixture comprising:

a body comprising a base portion, which is configured to mount to a support surface, and a stem portion supported by the base portion, the stem portion configured to discharge fluid;

a mixing valve located within the stem portion of the body, wherein the mixing valve is coupled to a first fluid delivery line providing a first fluid and to a second fluid delivery line providing the second fluid, the mixing valve further comprising a first stepper motor for controlling a first flow control valve within the mixing valve and a second stepper motor for controlling a second flow control valve within the mixing valve; and a controller located within the stem portion, wherein the controller is configured to control operation of the first and second stepper motors;

wherein each of the first control valve and the second flow control valve comprises an inlet and a valve member assembly to control the fluid flow through the respective flow control valve; and wherein the valve member assembly and the inlet of each of the first flow control valve and the second flow control valve is configured such that, when in use, fluid flowing through the first flow control valve exerts substantially no net force on the valve member assembly of the first flow control valve and fluid flowing through the second flow control valve exerts substantially no net force on the valve member assembly of the second flow control valve.

18. The plumbing fixture of claim 17, wherein the plumbing fixture is a faucet and the stem portion is configured to pivot relative to the base portion.

19. The plumbing fixture of claim 17, wherein the plumbing fixture is a faucet and the mixing valve and controller are located above an escutcheon of the faucet.

20. The plumbing fixture of claim 17, wherein the plumbing fixture is a faucet and the mixing valve and controller are located above a surface to which the faucet is mounted.

21. The plumbing fixture of claim 17, wherein the plumbing fixture is a shower head that extends from a wall and the mixing valve and controller are provided on the same side of the wall as the shower head.

22. The plumbing fixture of claim 17, wherein the plumbing fixture is selected from the group consisting of a bath tap, a sink tap, and a basin tap.

23. The plumbing fixture of claim 17, wherein the controller comprises a user interface accessible by a user outside the body of the plumbing fixture.

24. The plumbing fixture of claim 17, wherein the plumbing fixture is a shower head.

25. The plumbing fixture of claim 24, wherein the shower head is a hand shower and the mixing valve and controller are located within a handle of the hand shower.

26. The plumbing fixture of claim 17, wherein the controller includes a microprocessor mounted on a control panel.

27. The plumbing fixture of claim 26, wherein the control panel is a printed circuit board.

28. The plumbing fixture of claim 17, wherein the controller is programmable.

29. The plumbing fixture of claim 28, wherein the controller comprises a memory for storing different settings relating to at least one of temperature or flow rate for the plumbing fixture.

30. The plumbing fixture of claim 17, wherein the mixing valve comprises an electric heating element and the controller is configured to allow selection of a disinfection cycle in which the electric heating element is activated to heat the mixing valve.

31. The plumbing fixture of claim 30, wherein the controller comprises a memory and the memory is configured to record at least one of the time when the disinfection cycle is carried out, the temperature of outlet water, or the duration of the disinfection cycle.

32. A plumbing fixture comprising:

a body comprising a base portion, which is configured to mount to a support surface, and a stem portion, which is supported by the base portion and is configured to discharge fluid;

a mixing valve located within the stem portion of the body, wherein the mixing valve is coupled to a first fluid delivery line providing a first fluid and to a second fluid delivery line providing the second fluid, the mixing valve comprising a first stepper motor for controlling a first flow control valve within the mixing valve, a second stepper motor for controlling a second flow control valve within the mixing valve, and a mixing chamber, wherein each of the flow control valves comprises two valve outlets in communication with the mixing valve for controlling flow of fluids from the first and second flow control valves to the mixing chamber; wherein the two outlets of each of the flow control valves are substantially the same size; and a controller located within the stem portion of the body, wherein the controller is configured to control operation of the first and second stepper motors.

33. The plumbing fixture of claim 32, wherein each of the first and second flow control valves comprise an inlet and a valve member assembly to control the fluid flow through the respective flow control valve, the valve member assembly and the inlet of each of the first and second flow control valves configured such that, when in use, fluid flowing through the first flow control valve exerts substantially no net force on the valve member assembly of the first flow control valve and fluid flowing through the second flow control valve exerts substantially no net force on the valve member assembly of the second flow control valve.

34. The plumbing fixture of claim 32, wherein each flow control valve includes a valve member assembly including a first valve member adapted to engage with a first valve seat associated with a first of the two valve outlets in a closed position of the flow control valve and a second valve member adapted to engage with a second, separate, valve seat associated with a second of the two valve outlets in the closed position of the flow control valve.

35. The plumbing fixture of claim 32, further comprising a user interface located on the base portion of the faucet, wherein the user interface includes a touch sensitive panel for inputting settings and a display for showing a temperature of the fluid discharged from the stem portion.

* * * * *